(12) United States Patent
Berkowitz et al.

(10) Patent No.: US 6,457,021 B1
(45) Date of Patent: Sep. 24, 2002

(54) IN-MEMORY DATABASE SYSTEM

(75) Inventors: Brian T. Berkowitz, Seattle, WA (US); Sreenivas Simhadri, Issaquah, WA (US); Peter A. Christofferson, Kenmore, WA (US); Gunnar Mein, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/135,917

(22) Filed: Aug. 18, 1998

(51) Int. Cl.[7] ............................................... G06F 17/30
(52) U.S. Cl. ........................... 707/201; 707/200; 707/8
(58) Field of Search ........................... 707/8, 200, 202, 707/201

(56) References Cited

U.S. PATENT DOCUMENTS

| | | | | |
|---|---|---|---|---|
| 4,914,569 A | * | 4/1990 | Levine et al. | 707/8 |
| 5,745,904 A | | 4/1998 | King et al. | 707/200 |
| 5,832,508 A | * | 11/1998 | Sherman et al. | 707/200 |
| 5,835,766 A | * | 11/1998 | Iba et al. | 709/104 |
| 5,878,410 A | * | 3/1999 | Zbikowski et al. | 707/2 |
| 6,029,177 A | * | 2/2000 | Sadiq et al. | 707/201 |

OTHER PUBLICATIONS

In–Memory Data Management Technical White Paper obtained via the Internet at http://www.timesten.com/products/wp.html, Jun. 1999.*
In–Memory Database for 32–bit and 64–bit Operating System obtained via the Internet at http://www.timesten.com/products/ttdatasheet.html, Jun. 1999.*
Krakovsky, M., "Understanding The Oracle Server", Chapter 4, pp. 35–48, Chapter 6, pp. 67–79, Chapter 12, pp. 157–169, 1996 Prentice Hall PTR.
Gray, J., Reuter, A., "Transaction Processing: Concepts and Techniques", Chapters 9 and 10, pp. 449–525, Morgan Kaufman Publishers, 1993.

* cited by examiner

Primary Examiner—Greta L. Robinson
(74) Attorney, Agent, or Firm—Klarquist Sparkman LLP

(57) ABSTRACT

An in-memory database system uses a shared memory to cache records and keys read from a database and controls the updating of the records and keys through a database manager process. When a transaction performs an update, the original, unmodified data is preserved in the shared memory, the new data is written to the shared memory, and a look-aside table for the transaction records the changes. A transaction performs read-only access to the shared memory using its own context while a versioning scheme based on the look-aside tables ensures a read-committed isolation level view of the original, unmodified data until the modifying transaction commits the update. The database manager is responsible for writing the new data into the shared memory and for maintaining the look-aside tables for all transaction which have made modifications to the data in the shared memory. The database manager also writes committed changes to the database and performs rollback on uncommitted changes in the shared memory using the entries in the look-aside table for the committing/aborting transaction. The shared memory is divided into logical pages and short duration page latches are employed to maintain consistency on the page while a transaction or the database manager is reading or writing data on the page.

34 Claims, 14 Drawing Sheets

IN-MEMORY DATABASE SYSTEM

FIELD OF THE INVENTION

This invention relates generally to databases, and more particularly to enabling multiple concurrent read-only access to database records.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1997, Microsoft Corporation, All Rights Reserved.

BACKGROUND OF THE INVENTION

Existing database systems employ a database manager that control reads and writes on the database records to guarantee consistency of the data. A transaction issues a record request to the database manager which is executed by switching between the context for the transaction and that for the database manager, typically a very expensive operation in terms of processing cycles. The reverse context switch is performed when the database manager completes the request and returns data to the transaction. However, when a transaction is only reading data and not making changes, the context switch introduces unnecessary overhead and slows the processing of the read-only transaction.

When the database manager immediately changes the data in the database in response to an update request, the database manager must reverse the changes using a rollback mechanism if the requesting transaction aborts. Therefore, in order to present a consistent view of the data to another transaction, the database manager either denies access to the changed data until the modifying transaction commits the changes, or permits the other transaction access to the data but must also rollback the other transaction if the modifying transaction aborts. The processing of read-only transactions is thus slowed when they execute concurrently with transactions that update common data.

Therefore, a database system is needed which permits read-only transactions direct access to data and which presents a consistent view of data to a transaction without the complications involved with standard rollback procedures.

SUMMARY OF THE INVENTION

The above-mentioned shortcomings, disadvantages and problems are addressed by the present invention, which will be understood by reading and studying the following specification.

An in-memory database system uses a shared memory to cache records and keys read from a database and controls the updating of the records and keys through a database manager process. When a transaction performs an update, the original, unmodified data is preserved in the shared memory, the new data is written to the shared memory, and a look-aside table for the transaction records the changes. A transaction performs read-only access to the shared memory using its own context while a versioning scheme based on the look-aside tables ensures a read-committed isolation level view of the original, unmodified data until the modifying transaction commits the update. The database manager is responsible for writing the new data into the shared memory and for maintaining the look-aside tables for all transaction which have made modifications to the data in the shared memory. The database manager also writes committed changes to the database and performs rollback on uncommitted changes in the shared memory using the entries in the look-aside table for the committing/aborting transaction. The shared memory is divided into logical pages and short duration page latches are employed to maintain consistency on the page while a transaction or the database manager is reading or writing data on the page.

A method of controlling access to database records which are stored in memory shared among multiple processes is described as creating record and/or index entries in a look-aside table, preserving the original data in the shared memory, and allowing a process access to the modified data if a corresponding record and/or index entries exists in the look-aside table for the process. The method also performs rollback and abort processing using the look-aside table.

The in-memory database system is described as having a plurality of clients which manipulate data, a shared memory for caching the data, an in-memory database manager that creates the look-aside table entries and writes changes to the shared memory. The details of data structures and page latches used by the in-memory database system are given. A particular implementation of the in-memory database system is also described.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular implementation of the invention is described that operates as part of Microsoft Corp.'s Distributed Transaction Coordinator. Finally, in the fifth section, a conclusion of the detailed description is provided.

Hardware and Operating Environment

Figure 1:
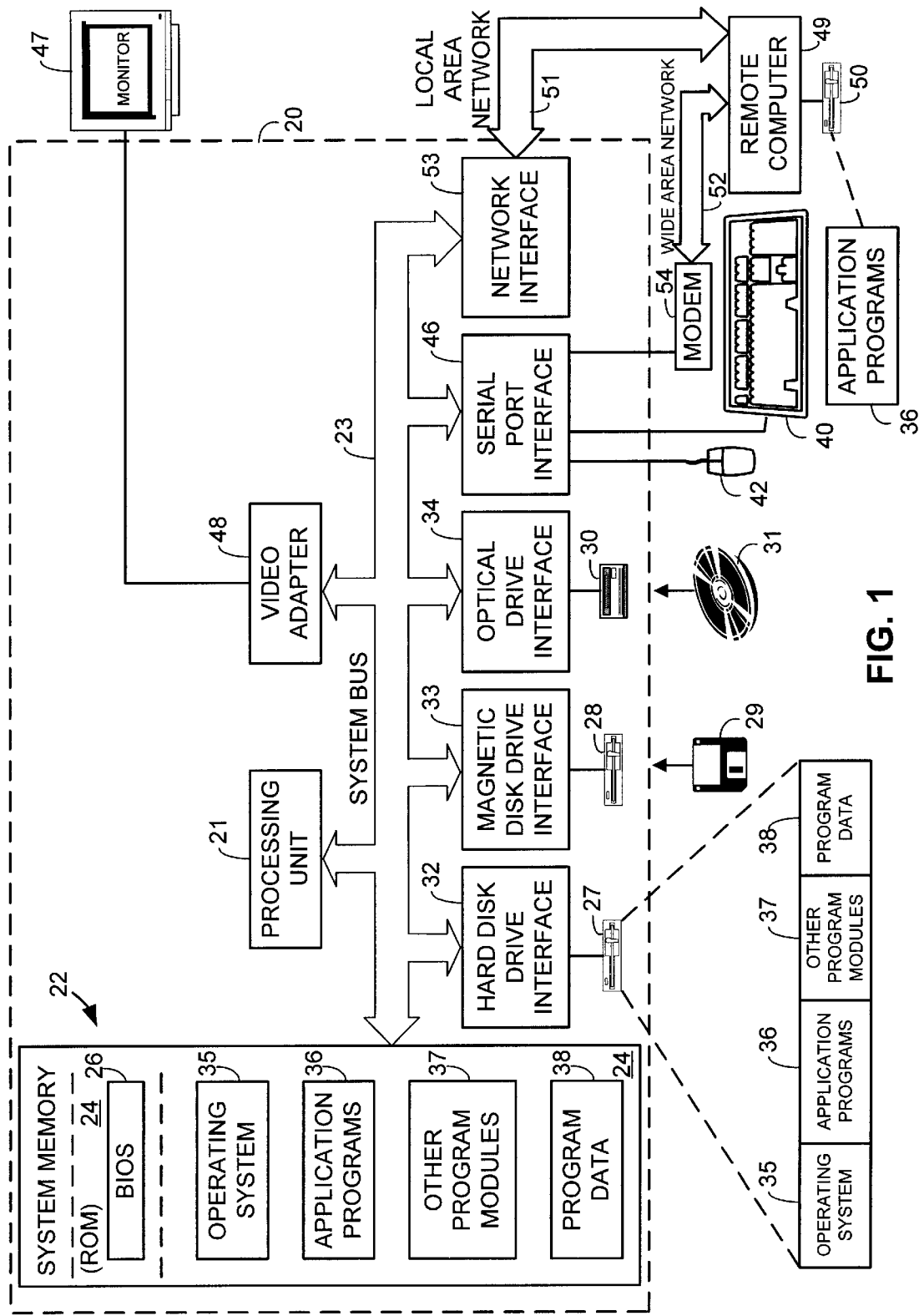
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, computers, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. a basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communication device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
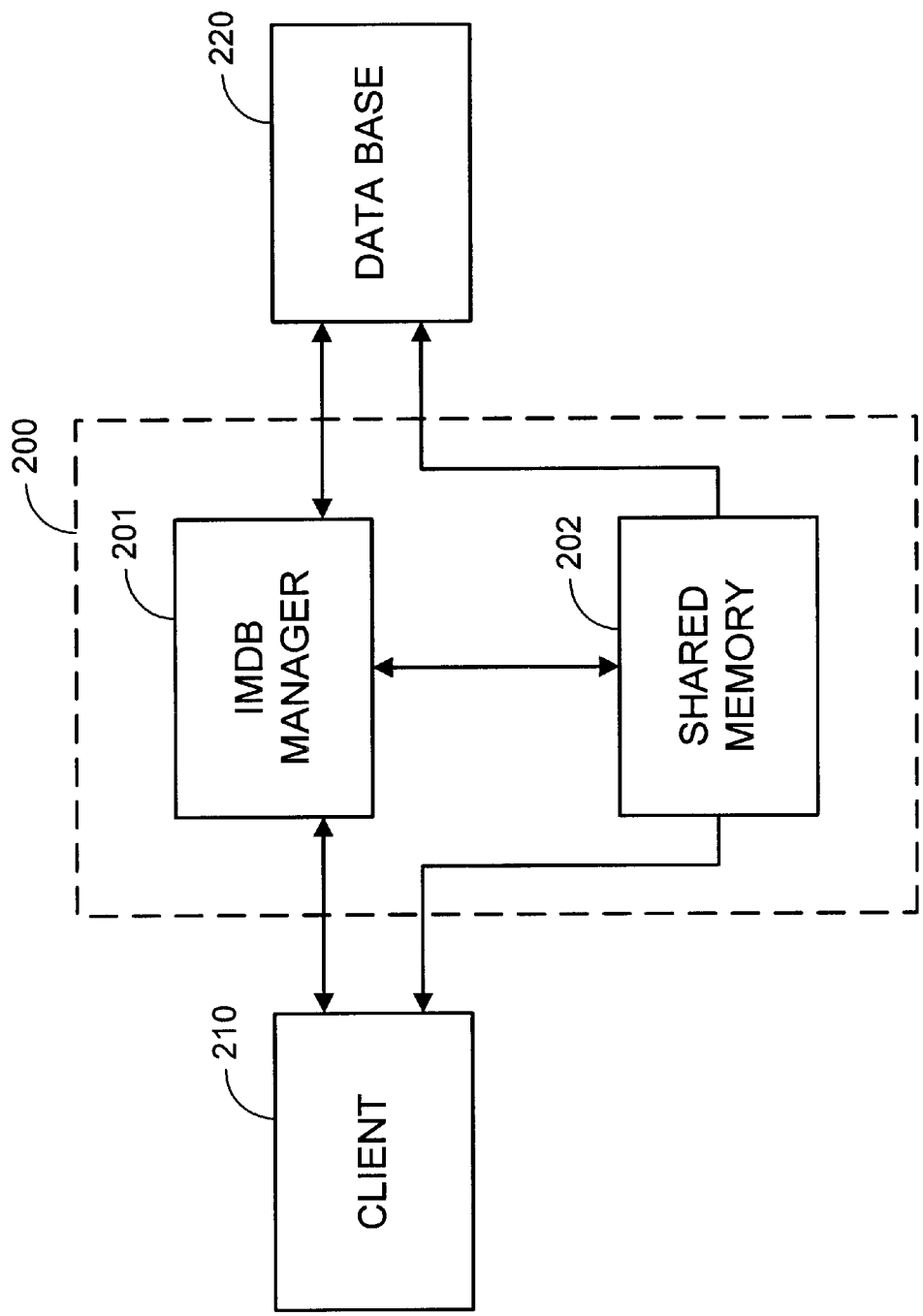
FIG. 2 is a diagram illustrating a system-level overview of an exemplary embodiment of the invention.

A system level overview of the operation of an exemplary embodiment of the invention is described by reference to FIG. 2. As shown in FIG. 2, an in-memory database system 200 comprises an in-memory database (IMDB) manager 201 and shared memory 202 in a computer such as local computer 20 in FIG. 1. The IMDB manager 201 is responsible for reading and writing records from a database 220 into and from shared memory 202 on behalf of a client process 210. Database 220 can be resident on the same computer as the in-memory database system 200 or can be located on a different computer such as remote computer 49 in FIG. 1. The client process 210 can reside on the same computer as the in-memory database system 200 or can execute on a different computer as long as the client process 210 can address the shared memory 202.

Because the client process 210 can address the shared memory 202 through its context, the client process can directly access the records in shared memory 202 without having to call the IMDB manager. In the exemplary embodiment, the client process 210 has read-only access to the records and calls the IMDB manager to modify or delete an existing record or to create a new record.

Figure 3A:
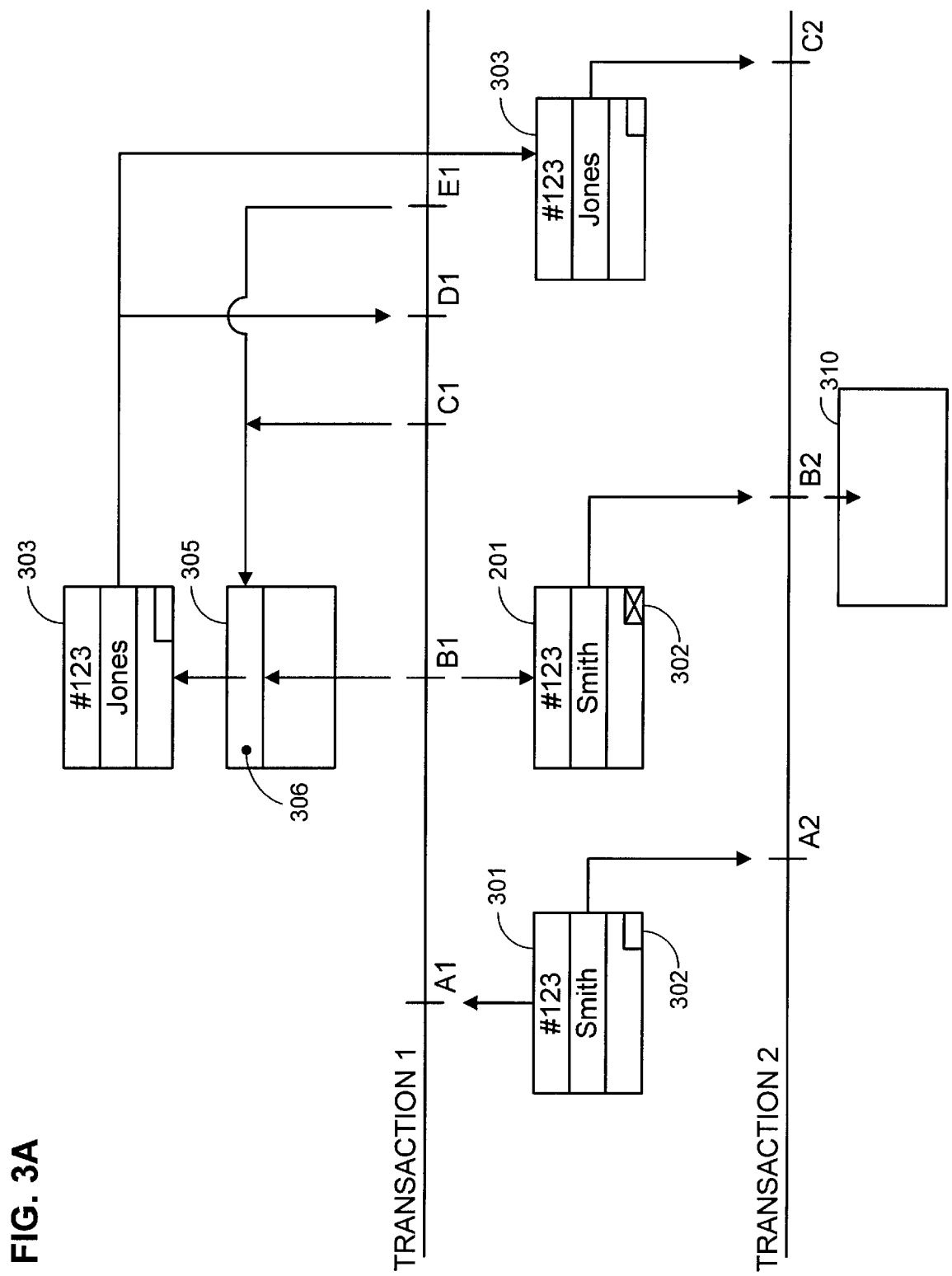
FIGS. 3A and 3B are time line diagrams illustrating the interactions of two client processes operating in the exemplary embodiment shown in FIG. 2.

FIG. 3A is a time line diagram illustrating the interactions of two client processes in accordance with the exemplary embodiment of the invention. Each client process is represented by a database transaction which performs operations on database records. In FIG. 3A, the two database transactions access the same database employee record for an employee named "Smith." The primary key for the employee records is the employee number which in the case of employee Smith is "123." The actions described below are divided among the transactions for the client processes and the IMDB manager 201 when one client process performs modifies a database record.

Transaction1 executes a retrieve command on the employee record "123" which returns copy 301 of the employee record from shared memory 202 at time mark A1. If a copy of the record is not already in memory, the IMDB manager 201 reads a copy from the database 220 into shared memory 202. Transaction1 modifies the last name of the employee from "Smith" to "Jones" at time mark B1. Because the name change has not yet been committed by transaction1, the modified record is not written back to the database. Instead, the IMDB manager 201 creates a modified copy 303 of the record in shared memory and sets a "modified" flag 302 in the original copy 301 of the record in the shared memory. The IMDB manager 201 also creates a look-aside table 305 for transaction1 in transaction1's context, if one does not already exist, and creates a record entry 306 in the look-aside table 305 which points to the location of the modified copy 303 of the record in shared memory. The look-aside table 305 is accessible only by transaction1 and by the IMDB manager.

When transaction1 wants to re-read the record at time mark C1 transaction1 specifies the key again and retrieves the original copy 301 from shared memory. Because the modified flag 302 is set in copy 301, the transaction1 searches its look-aside table 305 and finds the record entry 306. Transaction1 then retrieves the modified copy 303 of the record using the information in the record entry 306 at time mark D1. When transaction1 commits its changes at time mark E1, the IMDB manager writes all modifications specified in transaction1's look-aside table 305 to the shared memory and to the database. The look-aside table 305 is deleted after all the modifications have been committed.

As shown in FIG. 3A, transaction2 is executing concurrently with transaction1 Transaction2 issues a retrieve command using key "123" at time mark A2 which retrieves the copy 201 from shared memory. When transaction2 next retrieves the record using the key "123" at time mark B2 after transaction1 has modified the record, transaction2 reads the copy 301 from the database and recognizes that the modified flag 302 is set. Therefore, transaction2 knows that changes to the record are pending and searches its look-aside table 310, if one exists, for a corresponding record entry. Because transaction1 was responsible for the modification, transaction2 does not find a corresponding record entry and therefore continues its processing with the unmodified copy 301 of the record.

Once transaction1 has committed the changes (at time mark El), a third read operation by transaction2 on key "123" (at time mark C2) returns the modified copy 303 of the record in shared memory to transaction2. Note that transaction2 sees an inconsistency between the information in the copy 301 of the record retrieved at time marks A2 and B2, and the copy 303 retrieved at time mark C2. The in-memory database system of the present invention guarantees consistency of read-committed transactions but does not guarantee consistency of read-repeatable or serializable transactions.

Alternatively at time mark E1, transaction1 can abort and rollback the uncommitted changes using the information in the look-aside table. After rollback, the copy 301 of the employee record in the shared memory appears as it was at time mark A1, i.e., before transaction1 modified it at time mark B1. Rollback processing is described in detail in the next section.

Setting the modified flag in old records reduces the number of accesses required on the look-aside tables. However, alternate embodiments in which the modified flag is not used are also contemplated as within the scope of the invention. In these embodiments, the client process searches the look-aside table each time it retrieves a record from the shared memory.

Furthermore, as one of skill in the art will readily appreciate, various embodiments for the entries in the look-aside table are possible. In the exemplary embodiment being discussed in this section, each record in shared memory is located using a record identifier (RECID) specified in the index entries for the record. The RECID is also used as a hash key to search for the corresponding record entry in the look-aside tables. When record is modified, the IMDB manager hashes the RECID (OLDRECID) for the original record to determine which record entry to use in the appropriate look-aside table. The RECID (NEWRECID) for the modified record is written into the entry. In the interest of clarity, FIG. 3A does not show the index entries since only non-key data is modified in the example.

Figure 3B:
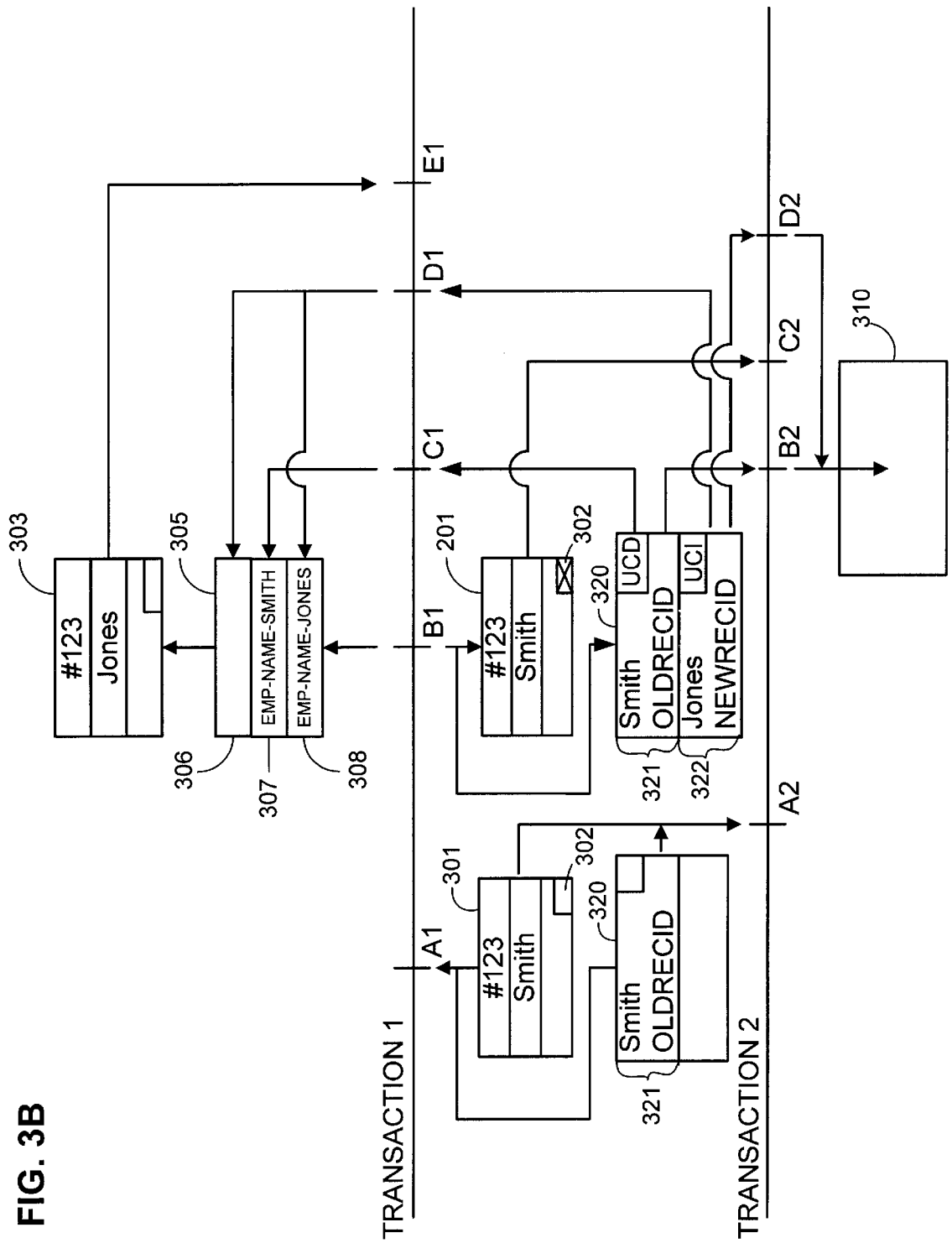

FIG. 3B shows the same series of transactions when the employee name is the primary key for the employee records. Therefore, in FIG. 3B, the primary index for the employee table is shown to illustrate the actions taken a key is changed.

As in FIG. 3A, a copy 301 of the employee record is read from shared memory at time mark A1, the record entry 306 pointing to the modified copy 303 is created in look-aside table 305, and the modified flag set in the original copy 301 at time mark B1.

Because the primary key for the record has changed, at time mark B1 the IMDB manager also inserts a new key entry 322 for "Jones" into the primary key index table 320 for the employee records. The new key entry 322 contains the new RECID (NEWRECID) for the modified record. The old entry 321 for "Smith" is marked as uncommitted-deleted (UCD) while the new entry 322 is marked as uncommitted-inserted (UCI). Two index entries 307, 308 are also added to the look-aside table 305. Index entry 307 contains an identifier for the employee table ("EMPLOYEE"), an identifier for the primary index ("NAME"), and the value of the deleted key ("SMITH"). Index entry 308 contains the identifier for the employee table ("EMPLOYEE"), the identifier for the primary index ("NAME"), and the value of the inserted key ("JONES"). The index entries are located by hashing on table identifier, index identifier, and key value.

At time mark C1, transaction1 issues a retrieve command on the employee record using the primary key "Smith." The index entry 321 is marked as uncommitted-deleted, so transaction1 uses the string "EMPLOYEE-NAME-SMITH" to search its look-aside table 305 for a matching entry. Because a matching entry, in this case entry 307, exists, transaction1 knows it is the modifying transaction, so the primary key of "Smith" does not exist for it and no record is returned. Similarly when transaction1 issues a retrieve command on the employee record using the primary key "Jones" at time mark D1, it determines it is the modifying transaction because entry 308 exists so it uses NEWRECID in the index entry 322 to retrieve the modified copy 303 of the record (time mark E1).

On the other hand, when transaction2 issues a retrieve command for the employee record using "Smith" at time mark B2, it determines that the primary key "Smith" is marked as uncommitted-deleted, and that it is not the modifying transaction since its look-aside table 310 does not contain a matching entry. The transaction2 can continue to use the original copy 301 of the record if the name modification is not critical to its processing (time mark C2). Similarly, when transaction2 issues a retrieve command for the employee record using "Jones" at time mark D2, it determines that the primary key "Jones" is marked as uncommitted-inserted, and that is not the modifying transaction, so it treats they key as if it were not in the index.

A similar scenario takes place when a secondary key for a record is modified. A transaction that is retrieving the record using the secondary key proceeds as described above for FIG. 3B where the index table and the index entries are specific for the secondary key. For secondary indices that are not required to have unique key values, the exemplary embodiment of the IMDB manager combines the secondary key value with the primary key value to yield a unique key value. Other commonly used mechanisms to create unique keys for non-unique keys are equally applicable and are within the scope of the invention.

After the secondary key is modified, a transaction retrieving the record using the primary key reads the unmodified copy of the record since the key entry in the primary key contains the OLDRECID. The modified flag in the record alerts the transaction that a change to the data is pending. The transaction then uses the OLDRECID to search its look-aside table and retrieves the modified copy if it finds a matching entry.

The IMDB manager creates both index and record entries in the look-aside table when a record is deleted. The affected key entry in the each index table is marked as uncommitted-deleted, an index entry in each appropriate look-aside table keyed on the record table, index, and deleted key value is created, and a null record entry in each look-aside table is created so that hashing into the look-aside table using the OLDRECID indicates that the record is deleted. Similarly, when a record is created, the IMDB manager creates a new key entry in the each index table marked as uncommitted-inserted and an index entry in each appropriate look-aside table keyed on the record table, index, and new key value. A record entry is also created in the look-aside table which contains the NEWRECID for the newly created record; the record entry is hashed into using a null value.

Marking key entries as uncommitted-deleted or uncommitted-inserted reduces the number of accesses to the look-aside table in the same fashion as setting the modified flag in an old record. Alternate embodiments in which the key entries are not so marked as contemplated as within the scope of the invention.

The system level overview of the operation of an exemplary embodiment of the invention has been described in this section of the detailed description. The IMDB system maintains data in the shared memory in both a new, uncommitted state resulting from a update function performed by a transaction, and in the original, committed state to provide versioning control for client processes. The IMDB system is predicated on two principals:

1. No record is updated (added, deleted or modified) by more than one transaction at a time so that there is always only one uncommitted copy of any record in the shared memory; and 2. No key entry in an index is inserted or deleted by more than one transaction at a time so that there is always only one uncommitted copy of any unique key in the shared memory.

While the invention is not limited to any particular set of transactions, for sake of clarity the modification of a single record using a simplified version of a look-aside table has been described. Alternate embodiments of the data structures for the look-aside table and the details of suitable hashing algorithms are described in section four.

Methods of an Exemplary Embodiment of the Invention

In the previous section, a system level overview of the operation of an exemplary embodiment of the invention was described. In this section, the particular methods performed by the clients and the IMDB manager of such an exemplary embodiment are described by reference to a series of flowcharts. The methods to be performed by the clients constitute computer programs made up of computer-executable instructions. Similarly, the methods to be performed by the IMDB manager constitute computer programs also made up of computer-executable instructions. Describing the methods by reference to flowcharts enables one skilled in the art to develop programs including instructions to carry out the methods on a suitable computer (the processor of the computer executing the instructions from computer-readable media).

The exemplary embodiment of a invention described by methods in the flowcharts of FIGS. 4–7 requires all index entries in the look-aside table to be unique. Because all secondary keys in a database may not be required to have unique values, the invention combines such secondary keys with the primary key for the record (which is unique) to create a unique key for the corresponding secondary index entry in the look-aside table. Additionally, if a record has been deleted and then the same record is reinserted by a transaction before the deletion is committed, the index entries for the record's keys in the appropriate look-aside table contain a NEWRECID for the reinserted record, which is used when retrieving the record by the transaction that deleted and reinserted the record. The key entries in the index tables contain an OLDRECID for the original record, which is used when retrieving the record by all other transactions.

Figure 4:
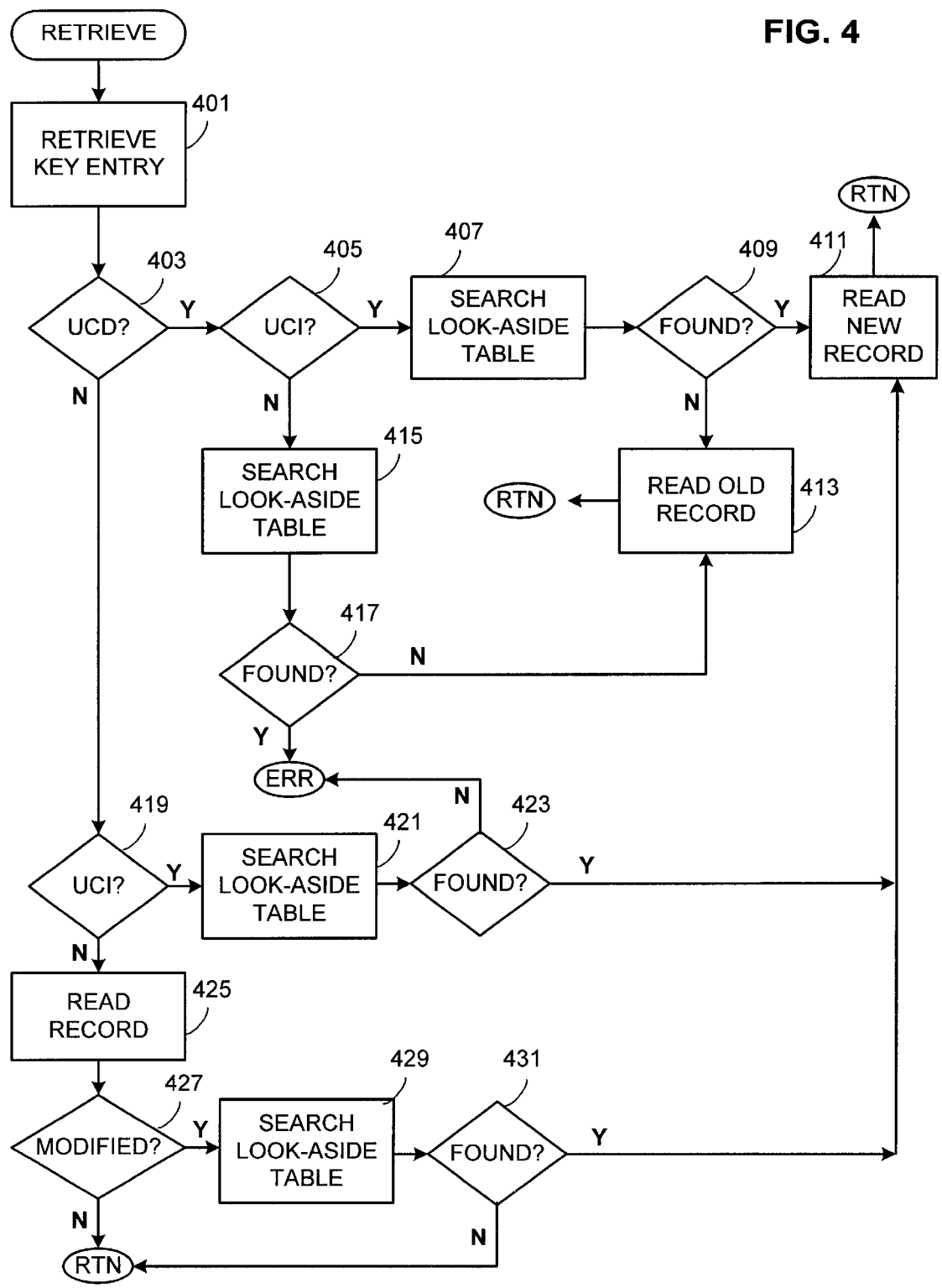
FIG. 4 is a flowchart of a method to be performed by a client process according to an exemplary embodiment of the invention.

Referring first to FIG. 4, a flowchart of a method to be performed by a client according to an exemplary embodiment of the invention is shown. This method is inclusive of the acts required to be taken by the client when retrieving a record.

The client uses an appropriate hashing algorithm, or other suitable method, to find the key entry in the appropriate index table in shared memory (block 401). The key entry can be either a primary key for the record or a secondary key depending on the criteria specified by the client in the retrieval command. The client next determines if the key entry has been changed.

If the key entry in the index table is marked as uncommitted-deleted (UCD) (block 403) and uncommitted-inserted (block 405), the client searches its look-aside table for a matching index entry (block 407). If a matching index entry is found (block 409), then the client uses the NEWRECID in the index entry to read the copy of the record it reinserted (block 411). If a matching entry is not found at block 409, then the original key still exists for the client and the client uses the OLDRECID in the key entry in the index table to read the original copy of the record (block 413).

If the key entry in the index table is marked as uncommitted-deleted (UCD) (block 403) but not uncommitted-inserted (block 405), the client searches its look-aside table for a matching entry (block 415). If a matching entry is found, the client has deleted the key so the key does not exist for it and thus no record is retrieved. If a matching entry is not found (block 417), the original key still exists for the client and the client uses the OLDRECID in the key entry in the index table to read the original copy of the record (block 413).

If the key entry is not marked as uncommitted-deleted (block 403) but is marked as uncommitted-inserted (UCI) (block 419), the client searches its look-aside table for a matching index entry (block 421). If a matching index entry is found (block 423), the client knows that it is the transaction that inserted (modified) the key and uses the NEWRECID in the index entry to read the modified copy of the record from shared memory (block 411). If a matching index entry is not found at block 423, the client knows that another transaction modified the key and has not committed the change so the key value does not exist for the client.

If the key entry is not marked as either uncommitted-inserted or uncommitted-deleted, the client reads the record from the shared memory using the RECID in the key entry (block 425). The client checks the modified flag in the record to determine if any data has been changed (block 427). If the modified flag is set, then the client searches its look-aside table for a matching record entry (block 429). If a matching record entry is found (block 431), then the client knows it is the transaction that modified the record, and uses the NEWRECID in the record entry to read the modified copy of the record from the shared memory (block 411). If the client does not find a matching record entry at block 431, the client knows that the unmodified copy of the record read at block 425 is the copy that exists for it.

The IMDB manager reads and writes records from the database using commands specific to the type of database used to store the records. For example, a relational database such as Oracle is accessed using standard SQL commands. The invention is not limited to use with only relational databases, but is applicable to any key-based data structure. The IMDB manager is responsible for assigning RECIDs to records and for storing the records in the shared memory. The IMDB manager is also responsible for creating the corresponding shared memory indices for a record, and for creating and managing the look-aside tables in shared memory. In one embodiment, the IMDB manager pre-loads entire tables of database records into shared memory, and creates the RECIDs and shared memory indices during an initialization phase. In an alternate embodiment, the IMDB manager pre-loads only a subset of database records when a range of key values is specified by a client.

The client transactions can only read information from shared memory and must call the IMDB to request modifications to the records and indices. One of skill in the art will immediately appreciate that any number of well-known data management techniques can be used by the IMDB manager in managing the shared memory. One particular technique is discussed in detail in the next section.

Figure 5A:
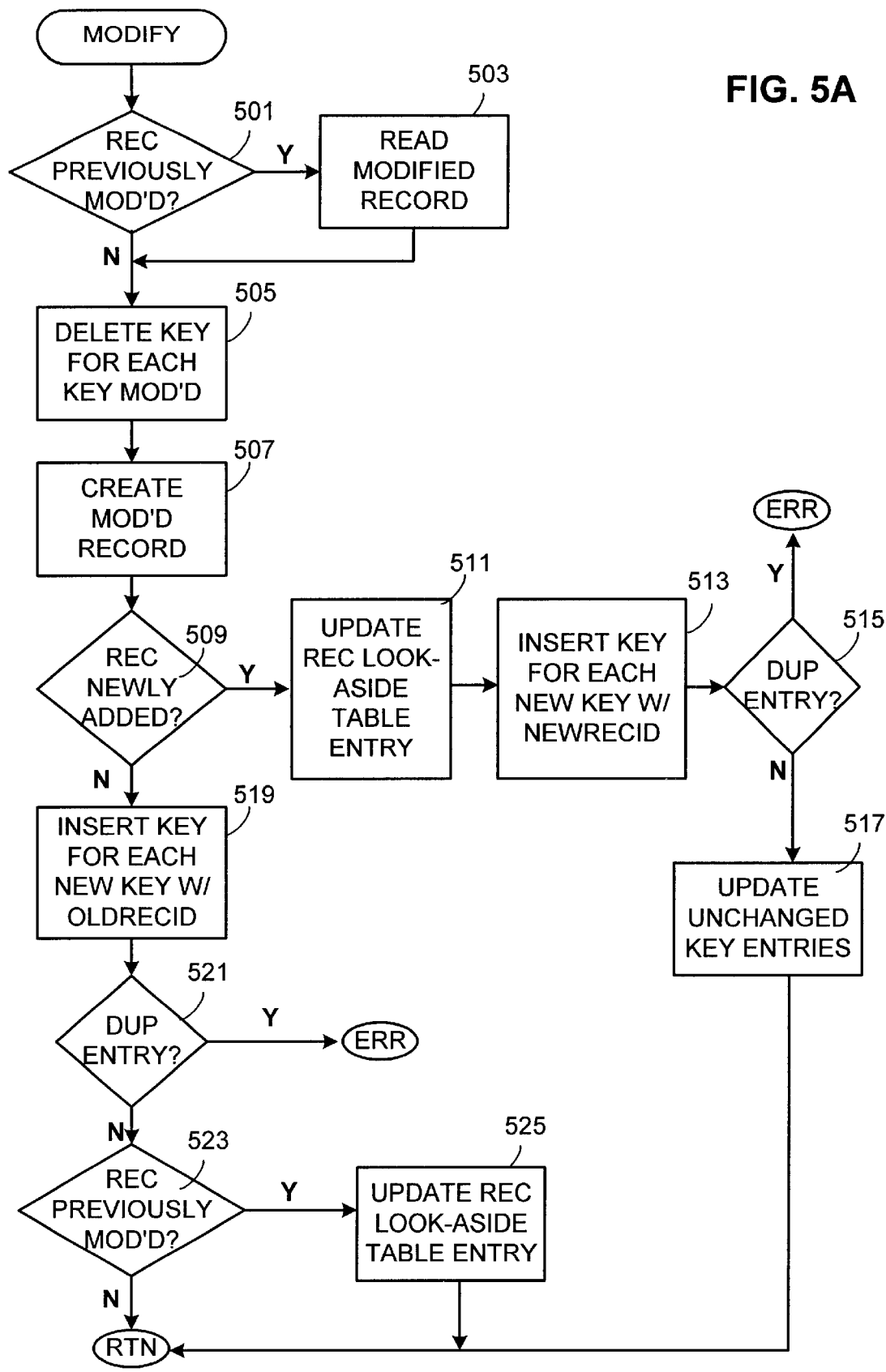
FIGS. 5A, 5B, 5C, 6, 7, 8 and 9 are flowcharts of methods to be performed by a database manager process according to an exemplary embodiment of the invention.
Figure 5B:
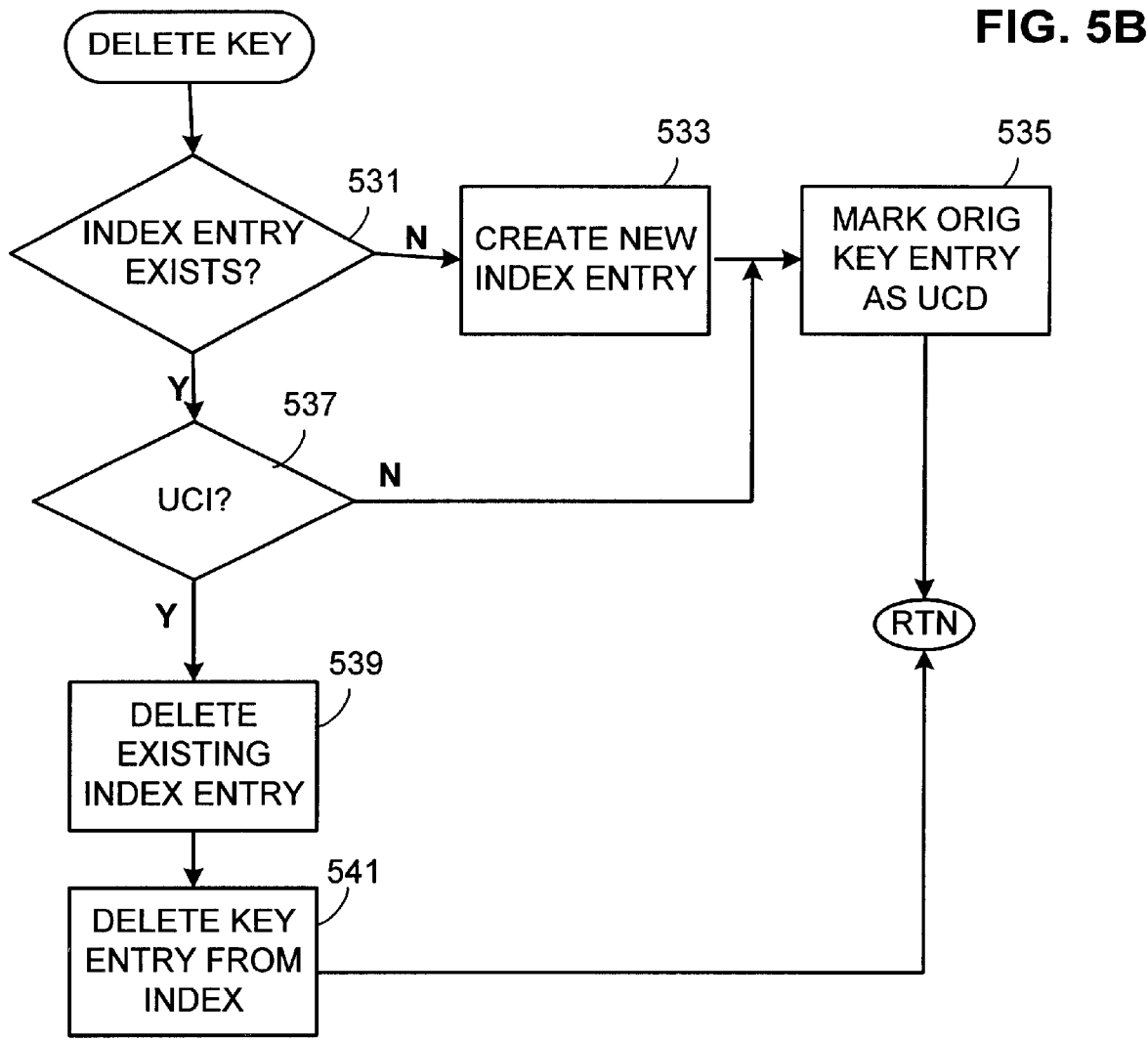
Figure 5C:
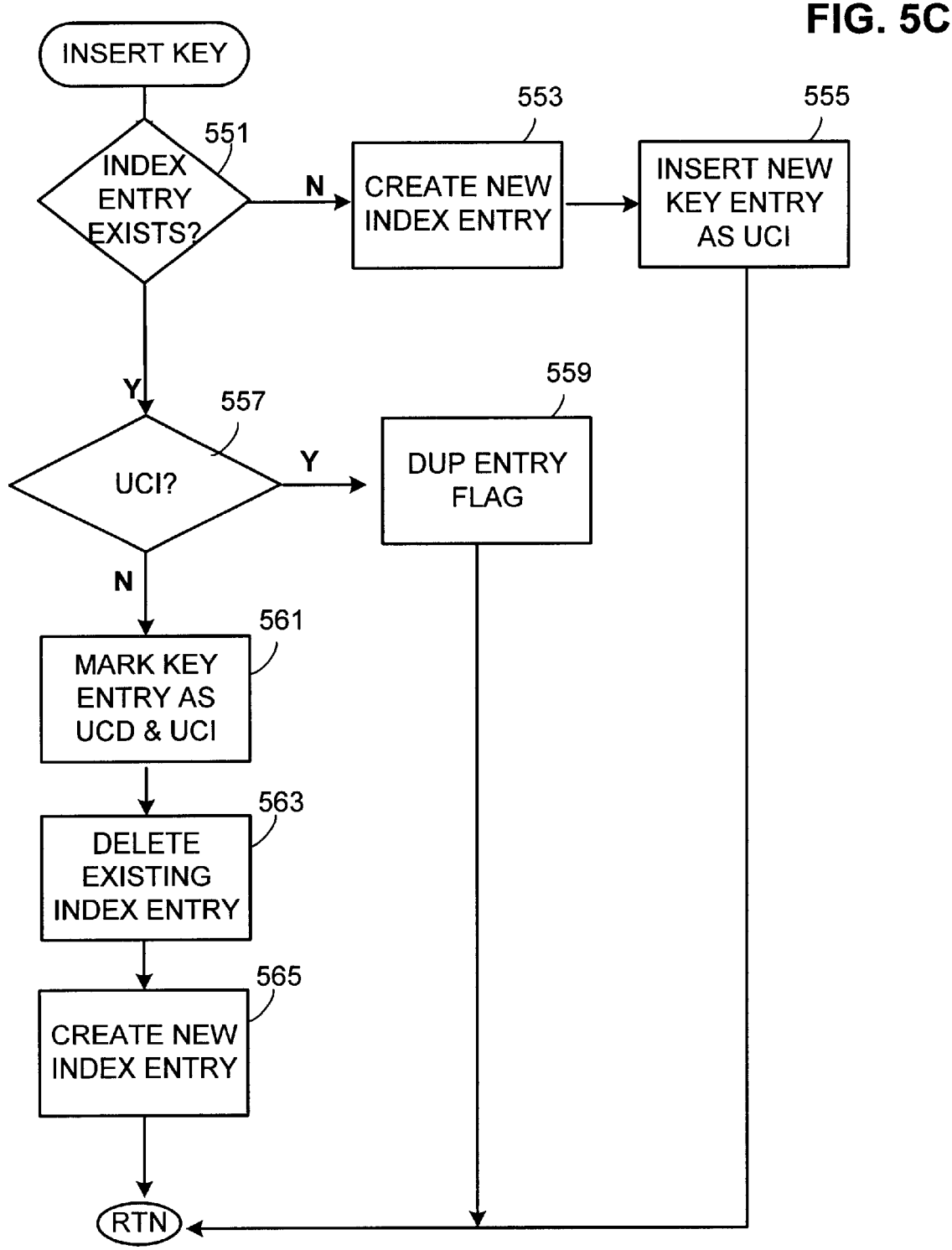
Figure 6:
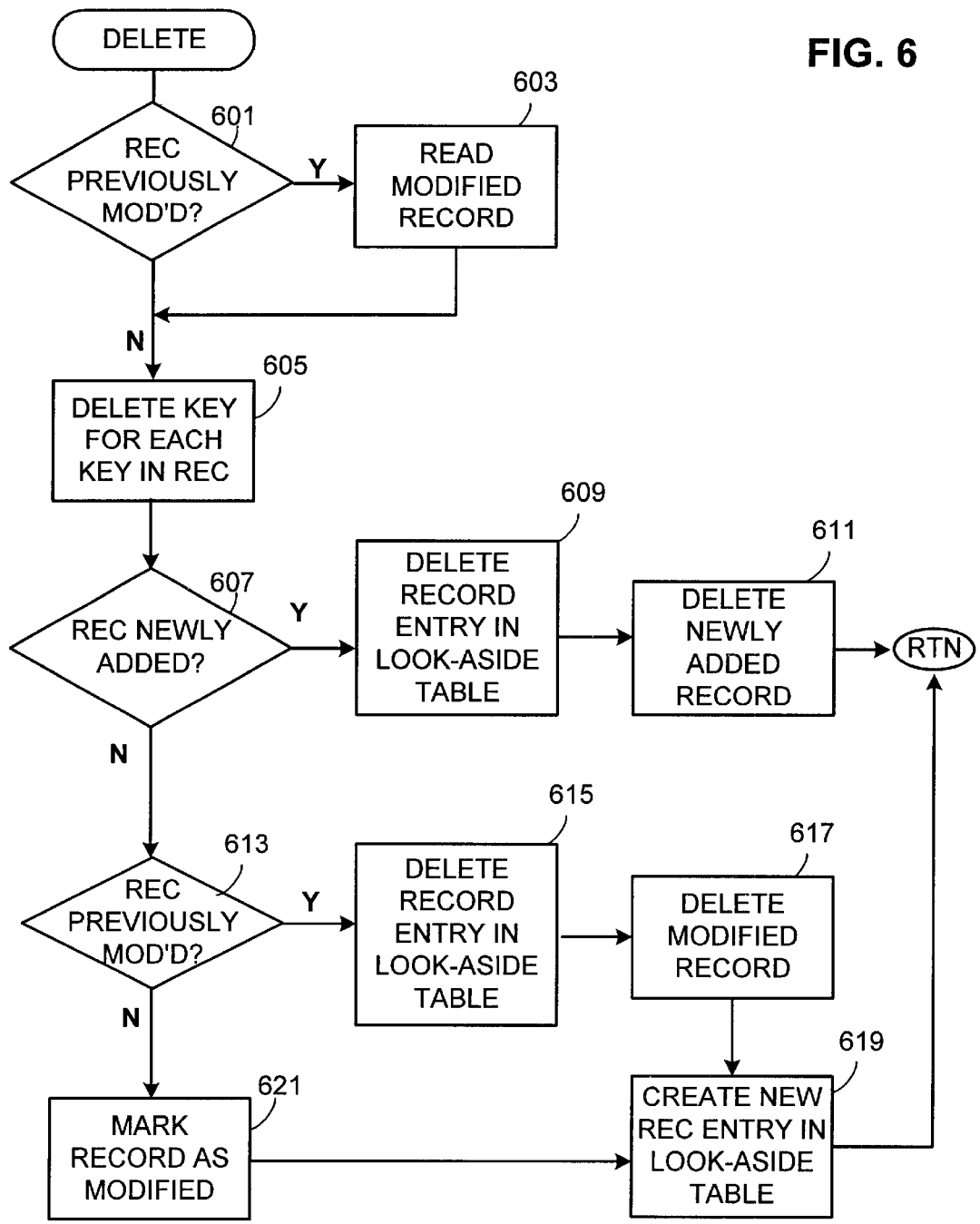
Figure 7:
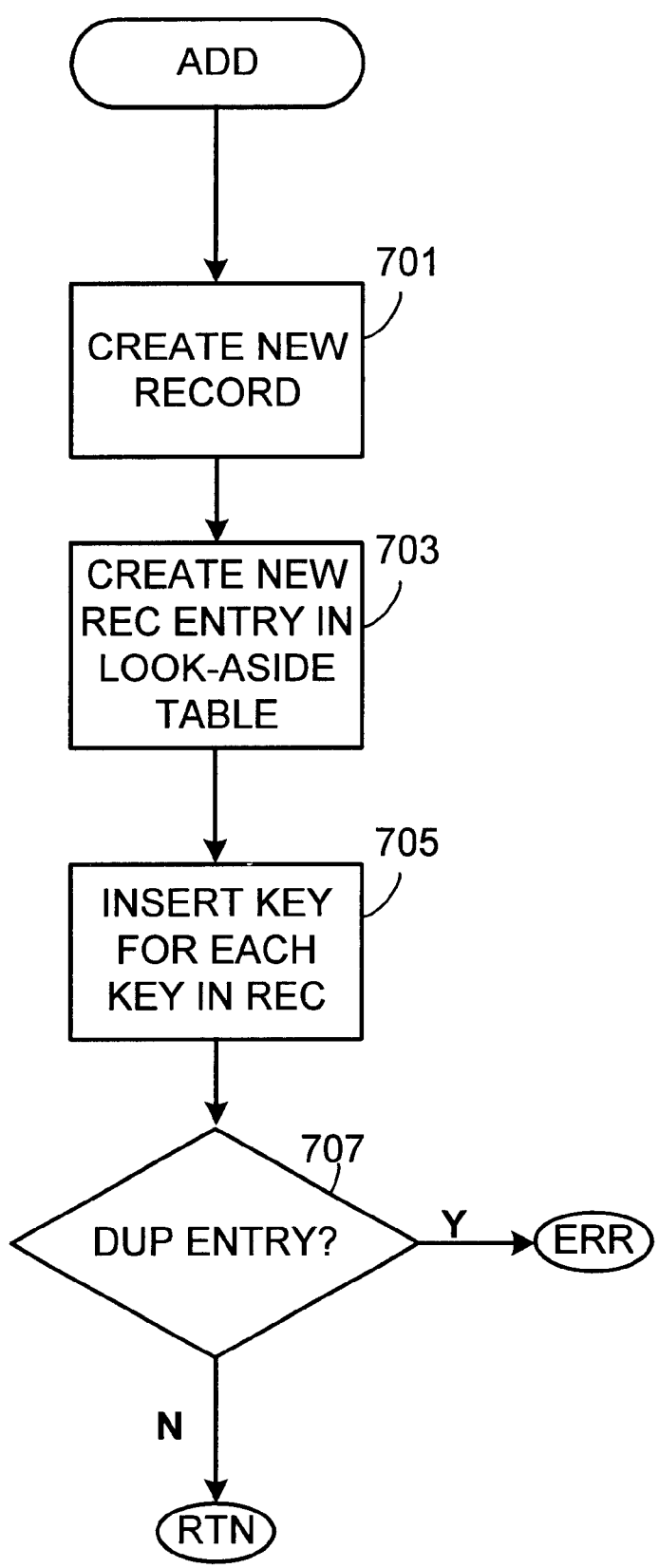
Figure 8:
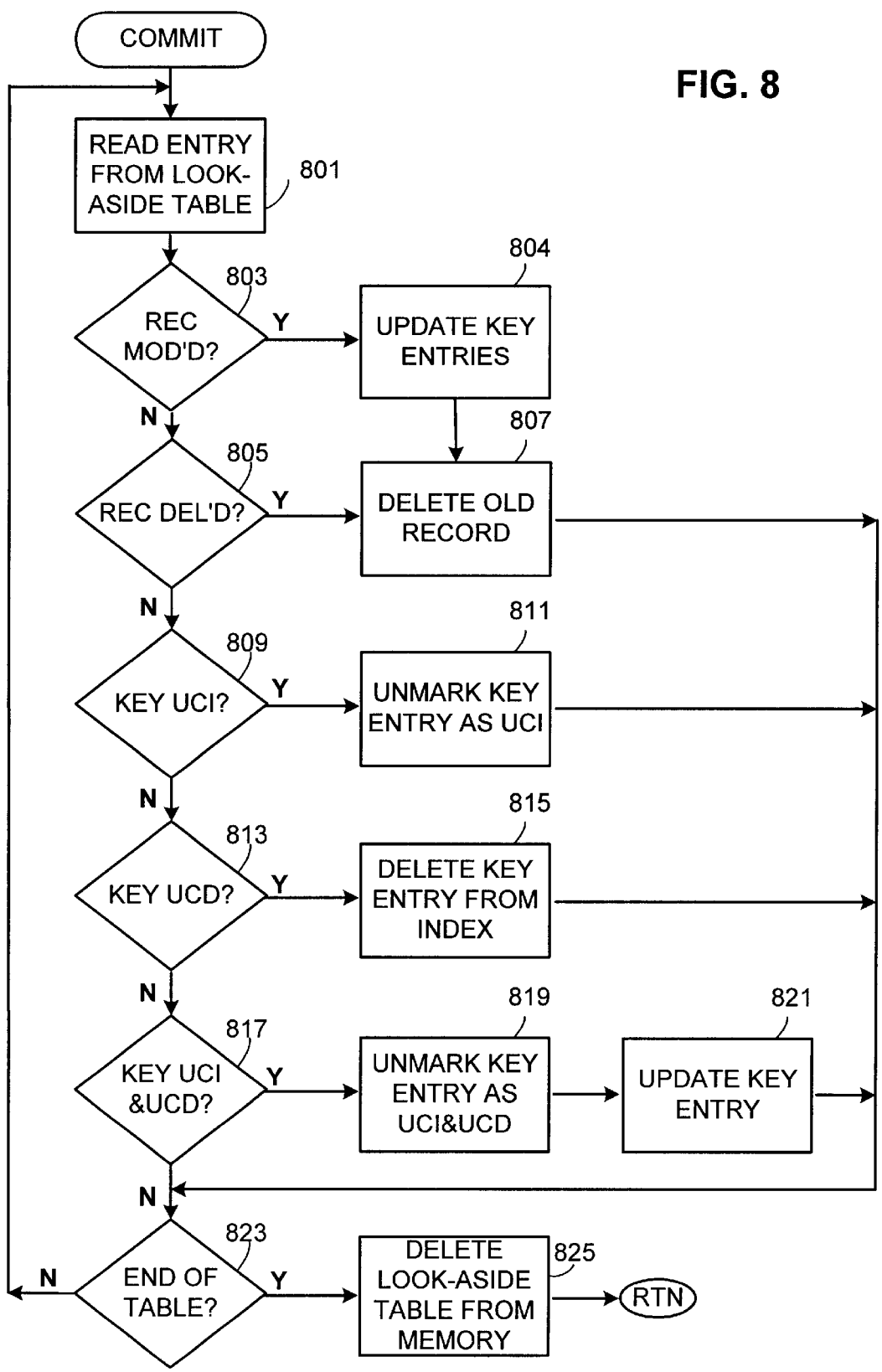
Figure 9:
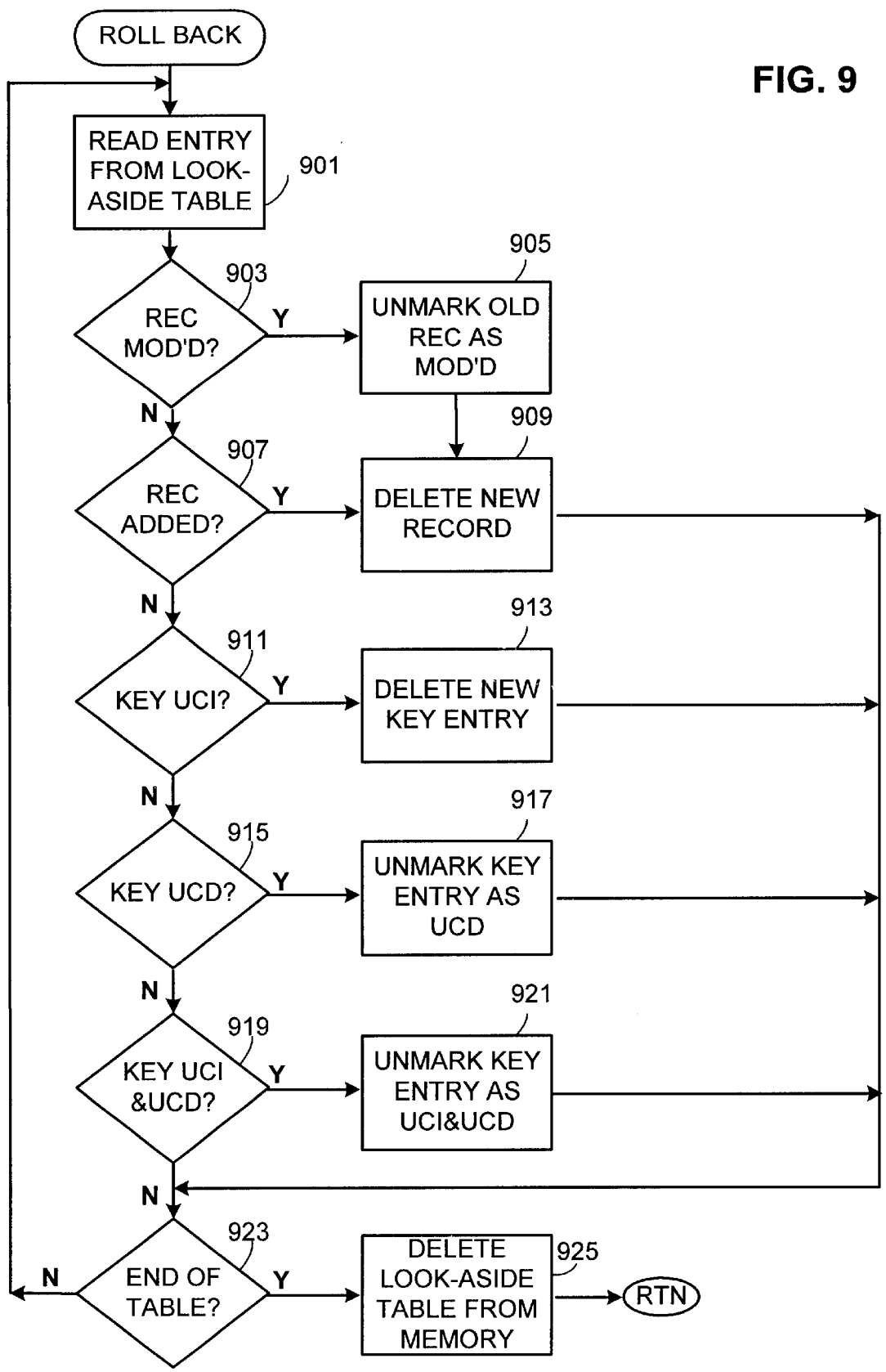

The client transaction calls the IMDB manager to perform five functions illustrated in FIGS. 5A–C (modify), FIG. 6 (delete), FIG. 7 (add), FIG. 8 (commit), and FIG. 9 (rollback). In the exemplary embodiment being described in this section, the IMDB creates a look-aside table for a client transaction when the transaction first requests a modification to a record in the shared memory (not illustrated). Alternate embodiments in which the IMDB manager creates the shared memory table at different stages in the processing of the transaction will be readily apparent to one of skill in the art and are contemplated as within the scope of the invention.

Turning first to FIG. 5A, when a client calls the IMDB manager to modify a record, the IMDB manager determines if the record has been previously modified by the same client (block 501), i.e., the modification has not yet been committed so a matching record entry exists in the client's look-aside table for the client. If so, then the previously modified copy of the record is used instead of that supplied in the function call (block 503). In an alternate embodiment, the IMDB manager returns an error message if the modified flag is set in the record and a matching entry in the look-aside table is not found as a check to ensure a client does not attempt to modify a record having uncommitted modifications made by another client.

The IMDB manager performs a DeleteKey operation on the old value for each key that is to change (block 507). The DeleteKey operation is described in more detail below in conjunction with FIG. 5B.

The IMDB manager creates the modified record in shared memory with a NEWRECID (block 509). If the record being modified is newly added (block 51 1), i.e., added by the same transaction and not yet committed, the IMDB manager updates the look-aside table entry for the record by replacing the RECID for the previous copy of the record with the NEWRECID for the modified record (block 513). The IMDB manager performs an InsertKey operation on the new value for each key that is to change to equate the new key value with the NEWRECID (block 515). Duplicate key entries that are detected by the InsertKey operation, as described in more detail below in conjunction with FIG. 5C, cause the record modification to fail. For each key that is not being modified, the IMDB manager updates all the corresponding key entries for the appropriate indices in shared memory with the NEWRECID (block 517).

If the record being modified is not newly added, the IMDB performs an InsertKey operation on the new value for each key that is to change to equate the new key with the OLDRECID of the copy of the record before the current modification (block 519). The retrieval function described above maps the new key to the NEWRECID for the client that modifies the record; the new key does not exists for the other clients. As before, if the key is a duplicate (block 521), the record modification fails.

If the record was previously modified (block 523), then the record entry in the look-aside table is updated by replacing the RECID for the previously modified record with the NEWRECID for the current modified record (block 525).

The DeleteKey operation is illustrated in FIG. 5B and performed by the IMDB manager when executing the modify and delete functions. The IMDB manager determines if an index entry in the look-aside table exists with the same key value that is being deleted (block 531). If not, then the IMDB manager creates a new index entry in the look-aside table that contains the deleted key value and RECID of the corresponding record (block 533). The IMDB manager also marks the key entry for the deleted value in the index table as uncommitted-deleted (block 535).

If there is a matching index entry in the look-aside table at block 531, then the IMDB manager determines if the corresponding key entry in the index table is marked as uncommitted-inserted (block 537). If not, the entry must be marked as both uncommitted-deleted and uncommitted-inserted so the index entry is retained and the key entry is remarked as uncommitted-deleted (block 535). If the key entry is marked as uncommitted-inserted at block 537, then both the existing index entry and the key entry are deleted (blocks 539 and 541).

The InsertKey operation is illustrated in FIG. 5C and performed by the IMDB manager when executing the modify and add functions. The IMDB manager determines if an index entry in the look-aside table exists with the same key value that is being inserted (block 551). If not, then the IMDB manager creates a new index entry in the look-aside table that contains the new key value and the RECID specified in the InsertKey operation (block 553). The IMDB manager also inserts an entry for the new key value in the index table and marks the entry as uncommitted-inserted (block 555).

If the index entry does exist at block 551, then the IMDB manager determines if the key entry in the index table is marked uncommitted-inserted (block 557). If so, then the key to be added is a duplicate and an error flag is set (block 559). If the key entry is not marked uncommitted-inserted, then the entry must be uncommitted-deleted. Therefore, the existing key entry is marked as both uncommitted-deleted and uncommitted-inserted (block 561), the existing index entry in the look-aside table is deleted (block 563), and a new index entry containing the reinserted key value and the NEWRECID for the reinserted record is created (block 565).

When the client calls the IMDB manager to delete a record (referring to FIG. 6), the IMDB manager determines if the record was previously modified (block 601) so that the modified record can be used rather than the record specified in the function call (block 603). As described in conjunction with FIG. 5, in an alternate embodiment, the IMDB manager checks if the same client performed the previous modification and returns an error if not.

The IMDB manager performs the DeleteKey operation illustrated in FIG. 5B for each key in the deleted record (block a605). If the record is newly added (block 607), the IMDB deletes the corresponding record entry in the look-aside table (block 609) and deletes the newly added record from shared memory (block 611).

If the record was previously modified (block 613), the IMDB manager deletes the record entry in the look-aside table (block 615) and deletes the modified record from the shared memory (block 617). The IMDB manager also creates a new record entry in the look-aside table that has a null value for the new RECID to denote that the record has been deleted (block 619). The null RECID entry is found by hashing on the RECID of the deleted record. If the record is neither newly added nor previously modified, the IMDB manager marks the record as modified (block 621) and creates the new null record entry at block 619.

FIG. 7 illustrates the acts performed by the IMDB manager when a client requests that a record be added to the database. The IMDB manager creates the new record in the shared memory marked as modified (block 701), adds a record entry containing the RECID of the new record to the look-aside table (block 703), and performs the InsertKey operation illustrated in FIG. 5C for each key in the record (block 705). If any of the keys duplicate existing key values (block 707), the record is not added.

Commit and rollback processes are mirror images of each other. When the client commits changes, it calls the IMDB manager to update the shared memory to reflect the modifications made by the client as shown in FIG. 8. The IMDB manager reads each entry in the look-aside table for the client (block 801) and determines what type of entry it is. The methods used to determine the entry type depends on the data structure of the look-aside table as one of skill in the art will immediately appreciate. The details of a particular look-aside table are described in the next section.

If the entry is for a modified record (block 803), the IMDB manager updates the corresponding key entries in the index tables for the record by replacing the original RECID in the key entries with the RECID for the modified record (block 804). The IMDB manager also deletes the original record from the shared memory (block 807). If the entry is for a deleted record (block 805), the IMDB deletes the original record from the shared memory (block 807). If the entry is an index entry corresponding to an added key (block 809), the IMDB manager removes the UCI marking from the key entry in the shared memory (block 811). If the entry is an index entry corresponding to a deleted key (block 813), the IMDB manager deletes the key entry from the shared memory (block 815). If the entry is an index entry corresponding to a key that has been reinserted (block 817), the IMDB manager removes the UCD and UCI markings from the key entry in the shared memory (block 819) and updates the key entry with the RECID from the corresponding index entry in the look-aside table (block 821). Note that if the entry is for an added record, the IMDB manager takes no action because the newly added indices when committed point to where the new record is stored in shared memory. Once all entries in the look-aside table have been processed (block 823), the IMDB manager deletes the look-aside table from the shared memory (block 825).

When a client does not commit its changes (aborts), it requests that the IMDB manager rollback the shared memory to a point prior to the changes by discarding all the modifications in shared memory (FIG. 9). The IMDB manager reads each entry from the look-aside table (block 901) and determines the type of entry as explained above in conjunction with FIG. 8. If the entry is for a modified record (block 903), the IMDB manager clears the modified flag from the original record in the shared memory (block 905) and deletes the modified (new) record from the shared memory (block 909). If the entry is for an added record (block 907), the IMDB manager deletes the new record from the shared memory (block 909). If the entry is an index entry for an added key (block 911), the IMDB manager deletes the new key entry from the shared memory (block 913). If the entry is an index entry for a deleted key (block 915), the IMDB manager removes the uncommitted-deleted (UCD) marking from the key entry in the shared memory (block 917). If the entry is an index entry for a reinserted key (block 919), the IMDB manager removed the UCD and UCI markings from the key entry in the shared memory (block 921). Note that when the entry is for a deleted record, the IMDB manager takes no action because the indices when rolled back will point to the original record in the shared memory. Once all entries in the look-aside table have been processed (block 923), the IMDB manager deletes the look-aside table from the shared memory (block 925).

The particular methods performed by a client process and an in-memory database manager process of an exemplary embodiment of the invention have been described. The method performed by the client process has been shown by reference to a flowchart including all the acts from 401 until 431. The methods performed by the in-memory database manager process has been shown by reference to six flowcharts including all the acts from 501 until 565, from 601 until 623, from 701 until 715, from 801 until 819, and from 901 until 921. As will be readily apparent to one skilled in the art, the particular order in which certain acts are performed can be varied without departing from the scope of the invention. For example, when a key is modified, the old key can be marked as uncommitted-deleted either before or after the new key is created because the both the original and changed keys are present in the shared memory.

Distributed Transaction Coordinator Implementation

In this section of the detailed description, a particular implementation of the in-memory database system is described that is part of the Distributed Transaction Coordinator (DTC) available from Microsoft Corp. The in-memory database system employed by the DTC uses page latches to control access to shared memory, and special hash table data structures and hash functions to implement the look-aside table and a transaction table.

Shared Memory

The shared memory for the IMDB is divided into logical fixed length pages. The records and index keys from the database are cached on the shared memory pages by the IMDB manager (core process). The index keys cached in the shared memory are arranged in balanced (B+) tree structures for quick access.

The look-aside tables for the client processes are also cached on the shared memory pages. In the DTC embodiment, the core process maintains a transaction table in the shared memory which associates a transaction identifier, such as a globally unique identifier (GUID), with its look-aside table.

As with the rest of the data in the shared memory, the client processes are permitted only read access to the look-aside tables and the transaction table.

A shared memory page comprises a header, a timestamp array, a slot array, and a data section. The header contains a page identifier, the number of entries (data base records, index keys, look-aside tables) stored on the page, a pointer to free space within the data section, and the size of the free space. The timestamp array stores a timestamp value for each page entry. The slot array contains one slot for each page entry; each slot contains the offset of the entry from the start of the data section and the length of the entry.

Page Latches

A portion of the shared memory is reserved for page latches. Page latches are a synchronization mechanism which ensures the consistency of the data on a page while a transaction is accessing the page. The page latches are associated with the page and thus can be maintained for multiple transactions operating on a page. Additionally, page latches are of short duration, lasting for only as long as necessary to read or write data to the page. These characteristics also mean that page latches are not subject to deadlocks. In contrast, traditional database locks are associated with a single transaction to keep the transaction consistent, are held for the duration of the transaction, and can incur deadlock situations which require the implementation of complex deadlock detection and resolutions algorithms.

There is a single exclusive page latch associated with each page which is used by the core process to prevent client processes from accessing the page while the core process is updating data on the page. Each page also has multiple shared page latches. Any process (client or core) can obtain a shared page latch which allows the holder to read data from the page. There are as many shared page latches active at one time as there are transactions accessing the page. Note that a transaction having many threads of execution will use only a single shared page latch for all the threads.

If there is an exclusive latch on a page, no shared latches can be active. Similarly, when a thread in the core process requests an exclusive page latch, it must wait until all active shared page latches have been released. Thus, page latches provide increased performance in read-intensive environments, which are the most common types of database transactions.

Because page latches are meant for short duration operations and no deadlock detection scheme is used for them, the client and core processes are designed to obtain page latches in such a way as to prevent deadlock. Typically a thread of execution will obtain only a single latch at a time. However when multiple latches are required, a predetermined ordering is used. When multiple index pages in the B+ tree structure must be latched, a parent page is latched before any of its children pages. When multiple pages at the same level in the index, or multiple data pages, must be latched, they pages are latched in physical order. For example if pages p1, p2, and p3 must be latched where p1 is a non-leaf page and p2, and p3 are leaf pages in the index, then p1 is latched first, then the lower of p1 and p2, then the higher of p1 and p2.

The page latches for a data page are not stored on the data page because the client process must have write access to the page latch itself in order to obtain the latch and only the core process has write access to the data pages. Instead the page latches are stored in a region of shared memory separate from the database pages themselves and shared by the core and client processes in write mode. In the DTC implementation, the page latch memory region contains eight bytes of latch data for each data page in the shared memory. Therefore, a particular page latch can be found by using the page number to determine the offset for the page latch shared memory, e.g., for page i, the offset in the shared page latch table is i * 8.

Each page latch consists of two fields (both 32-bits in length):

dwShareCount that indicates the number of shared readers of the page; and fExclusive which is set to indicate there is an exclusive latch requested on the page.

A page is share latched if dwShareCount is greater than zero. A page is exclusively latched if dwShareCount is zero and fExclusive is set (equal to one). A page is share latched but the core process is waiting for an exclusive latch if dwShareCount greater than zero and fExclusive is one.

When a thread wants to acquire a shared latch, it executes the following procedure:

1. Determines if fExclusive is 0. If so, go to 2, otherwise go to 5.
2. Increment dwShareCount (using an InterlockedIncrement instruction that guarantees that only one thread will increment the count; multiple threads trying to increment the count are processed in a serial fashion).
3. Determine if fExclusive is 0. If so, then return.
4. Decrement dwShareCount (using InterlockedDecrement).
5. Sleep and go to 1.

Thus, a thread can only acquire a shared latch if no other thread has an exclusive latch or is waiting for an exclusive latch. Note, that after incrementing the share count, the thread determines if fExclusive is set because in the interval, another thread may come along and may successfully obtain an exclusive latch as described in more detail below.

A thread releases a shared latch by using Interlocked Decrement to decrement dwShareCount.

When a thread wants to acquire an exclusive latch, it executes the following procedure:

1. Use InterlockedCompareExchange to set fExclusive to 1. The InterlockedCompareExchange instruction guarantees that a single thread sets fExclusive to 1, so either the instruction will succeed in setting fExclusive to 1 or it will fail which indicates that the exclusive was already set to 1.
2. If the instruction fails, then another thread has or is waiting for an exclusive latch. Sleep and retry until it succeeds.
3. If the instruction succeeds in setting fExclusive to 1, determine whether dwShareCount is greater than 0.
4. If dwShareCount is 0, then return.
5. Set a local counter timesThroughLoop to 0.
6. If dwShareCount is greater than 0 then determine if timesThroughLoop is greater than some predetermined maximum. If so, then go to 8.
7. Increment timesThroughLoop, sleep, and go to 6.
8. Set dwShareCount to 0 and return.

A thread releases an exclusive latch by using InterlockedCompareExchange to set fExclusive to zero.

Because only one thread is allowed to set fExclusive at a time, the InterlockedCompareExchange instruction is used. The InterlockedCompareExchange instruction sets a memory variable to a value only if the memory compares equal to another value. The above procedure calls InterlockedCompareExchange(&fExclusive, 1, 0) so that InterlockedCompareExchange will only set fExclusive to one if fExclusive is equal to zero. InterlockedCompareExchange can be implemented either on the underlying processor or in the operating system using other synchronization primitives provided by the processor.

After obtaining fExclusive, the thread waits for dwShareCount to fall to zero. As discussed above, latches are meant for short duration operations so that the share count falls to zero relatively quickly as other threads release their share latches and because no thread can acquire a shared latch on the page since shared latches cannot be acquired when fExclusive is set. However, because the client processes are running untrusted application code, it is possible that a client process can die while holding a share latch. To recover from this situation, the core process resets the share count if it unable to acquire an exclusive latch after some period of time (e.g., 5 seconds). The core process does not reset an exclusive latch since exclusive latches are only obtained by the core process threads and the core process only runs trusted code.

Hash Table Data Structures

Both the look-aside tables and the transaction table are implemented as hash table data structures. The look-aside table data structures are designed to give very high performance and can be scaled to different sizes, as described further below, to accommodate varying numbers of transactions and updates. The index and record entries described in the two previous sections are kept in the look-aside tables along with some miscellaneous entries.

Figure 10:
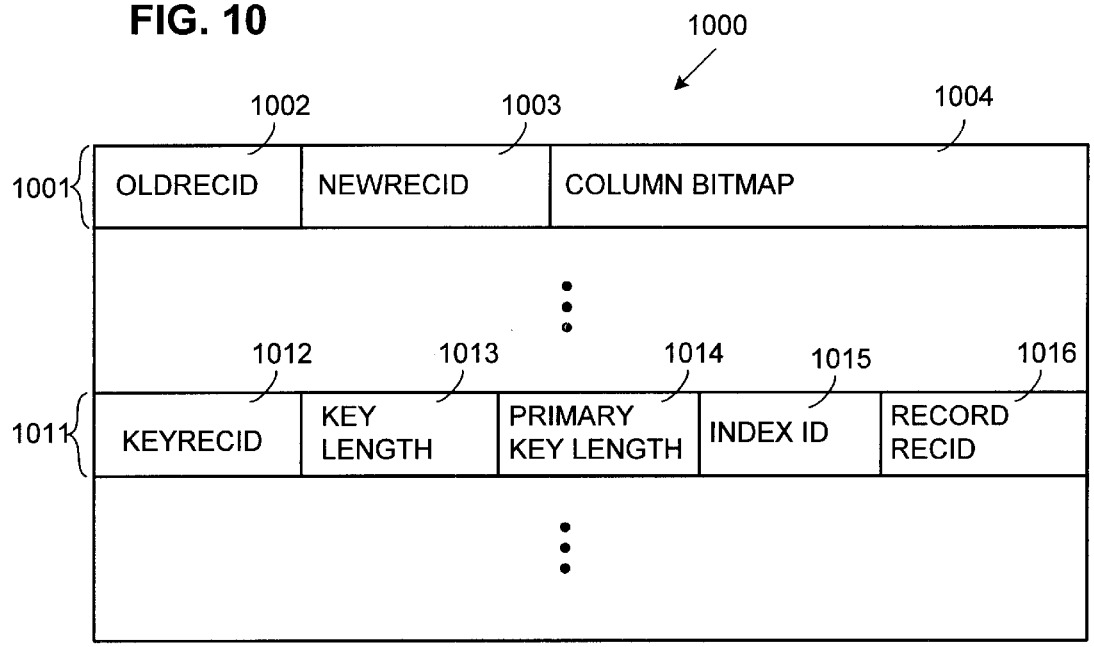
FIG. 10 is a diagram of a look-aside data structure for use in a n exemplary implementation of the invention.

The DTC embodiment of a look-aside table data structure 1000 is illustrated in FIG. 10. A record entry 1001 comprises three fields: a record identifier for the RECID of the unmodified record 1002, a record identifier for the RECID of the modified record 1003, and a bitmap 1004 used to denote which columns of the record have been modified. If a record is modified multiple times by a transaction, the later changes are OR'd together with the existing bitmap 1004 to create a new bitmap. The bitmap is used to construct the proper database calls when writing committed changes to a back-end database as part of the commit process.

An index entry 1011 comprises five fields: a RECID 1012 for the key, two key length fields 1013, 1014 for the key and the primary key respectively, an identifier 1015 for the index for the key, and a RECID 1016 of the new data record associated with the key if the key was deleted and then reinserted as described in the previous section. Because keys can be variable length in the DTC implementation, the key itself is allocated to a separate record to permit fixed length look-aside table entries. In one alternate embodiment, the key entry in the index serves as the separate key record for the look-aside table; in an alternate embodiment, the separate key record is distinct from the key entry so that dynamic allocation of additional keys to the index does not require changes in the index entry 1011. One of skill in the art will readily recognize that the key can be stored in the look-aside table entry if variable length table entries are supported or if the key is restricted to fixed-length values. When the key corresponding to an index entry is required to have unique values, the primary key field 1014 is null. When the key is not required to be unique, a combination of the key and the primary key is used for the index entry and thus both fields 1013 and 1014 contain valid values.

The particular index or record entry is found by translating a search key into a table address using a hash function shared between the core and client processes. The RECID is the search key for record entries. A combination of a database table identifier (which identifies the database table with which the index is associated), the index identifier, and the key value is used as the search key for index entries.

In the DTC implementation, a RECID is eight bytes long where five bytes specify the shared memory page number, one byte specifies the page sequence number, nine bits specify a slot on the page, and seven bits specify the slot sequence number. The slot sequence number and the page sequence number are used to distinguish recycled or overflow slots and pages. However, the sequence numbers are not useful in distinguishing one record from another when searching the look-aside table and so only the page number and slot are input into the hash function. The algorithm used by the hash function for record search keys in the DTC implementation is Let dw=low order four bytes of page #, bh=high byte of page #, and slot=slot# then hash=dw ^ bh ^ (slot <<23)

where ^specifies a bitwise exclusive OR operation and << specifies a left shift operation.

As described above, the search key for an index entry comprises a database table identifier, an index identifier (indexid), and the key value. The database table identifier is a sixteen byte database identifier (DBID) and a double word (32-bit) object identifier (OBJID) assigned by the operating system. The algorithm used by the hash function for index search keys in the DTC implementation is hash=OBJID ^(DBID <<16) ^indexid <<12^keyhash where keyhash is the result of a rotating exclusive OR'ing of the bytes of the key, for example:

let cb be the number of bytes in the key keyhash=key[0];

for (ib=1; ib<cb; ib++)
{
keyhash=_rotl(keyhash, 1);
keyhash=keyhash ^key[ib];
}

Figure 12:
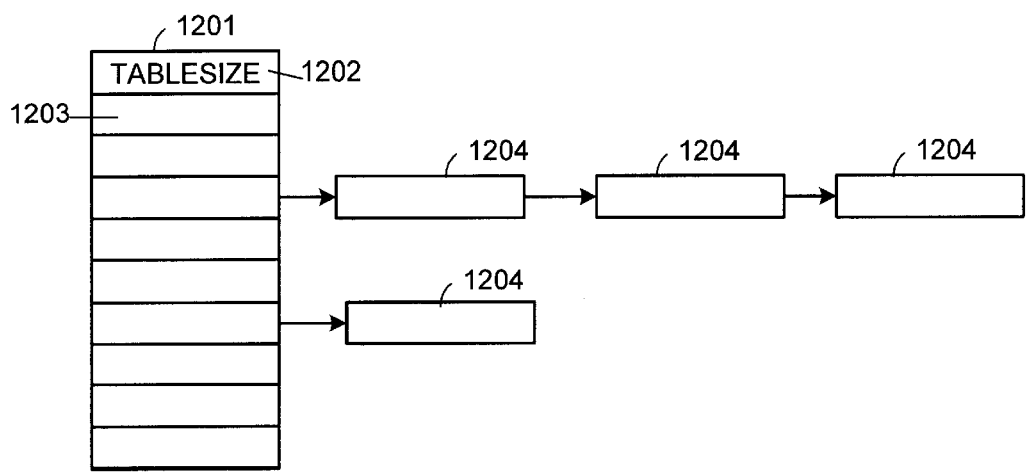
FIG. 12 is a diagram of a single level hash table data structure for use in an exemplary implementation of the invention.
Figure 13:
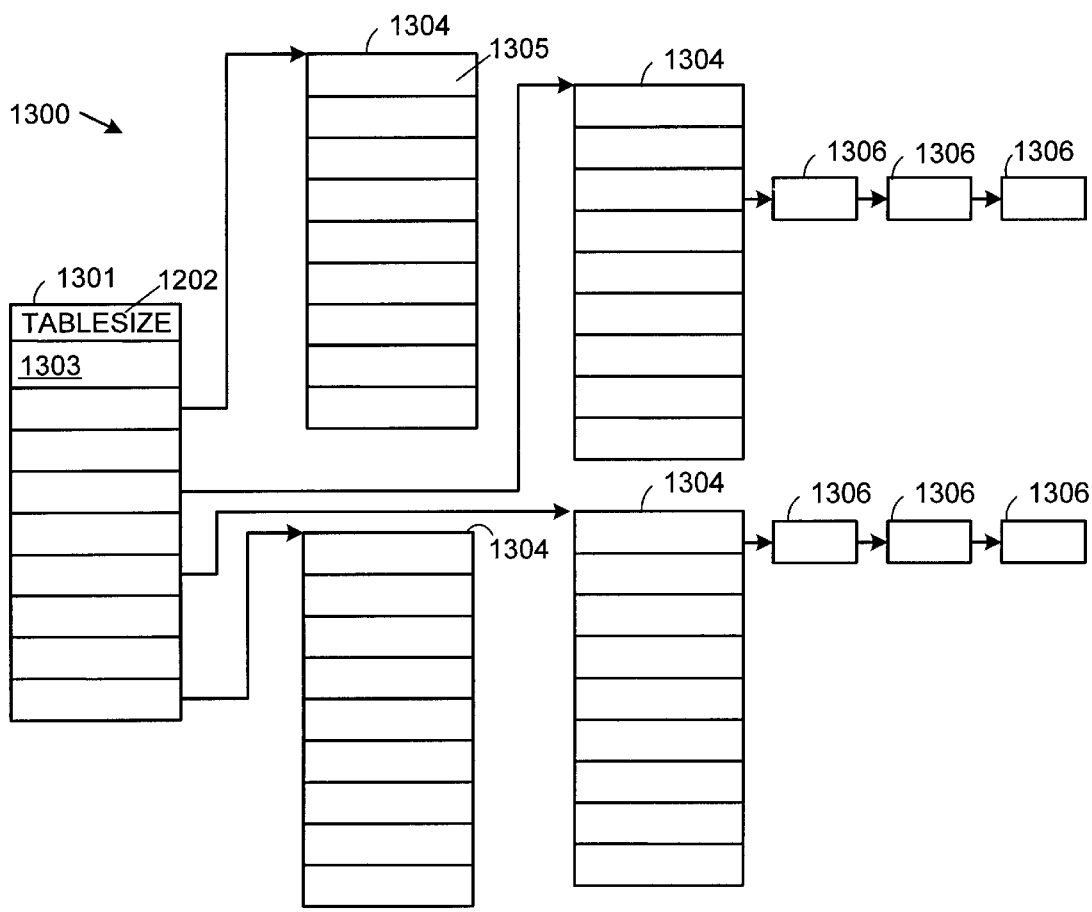
FIG. 13 is a diagram of a two level hash table data structure for use in an exemplary implementation of the invention.

The value of "hash" produced by the algorithms is divided by the maximum number of entries in the look-side table and the remainder is used as an address for the index or record entry. The hash algorithms are designed to produce a look-aside table address for an entry which is reasonably unique within the table, and falls in the range of zero to one less than the table size. Hash duplicates, or collisions, occur when record already exists at the table address calculated by the hash function for a new record. In such a case, the IMDB uses a linked list collision resolution scheme in which the new record is allocated to a space in shared memory and is linked to the hash address as illustrated in FIGS. 12 and 13 below. The value of the search key RECID is compared with the appropriate RECID field in each hash duplicate entry to find the correct entry.

Figure 11:
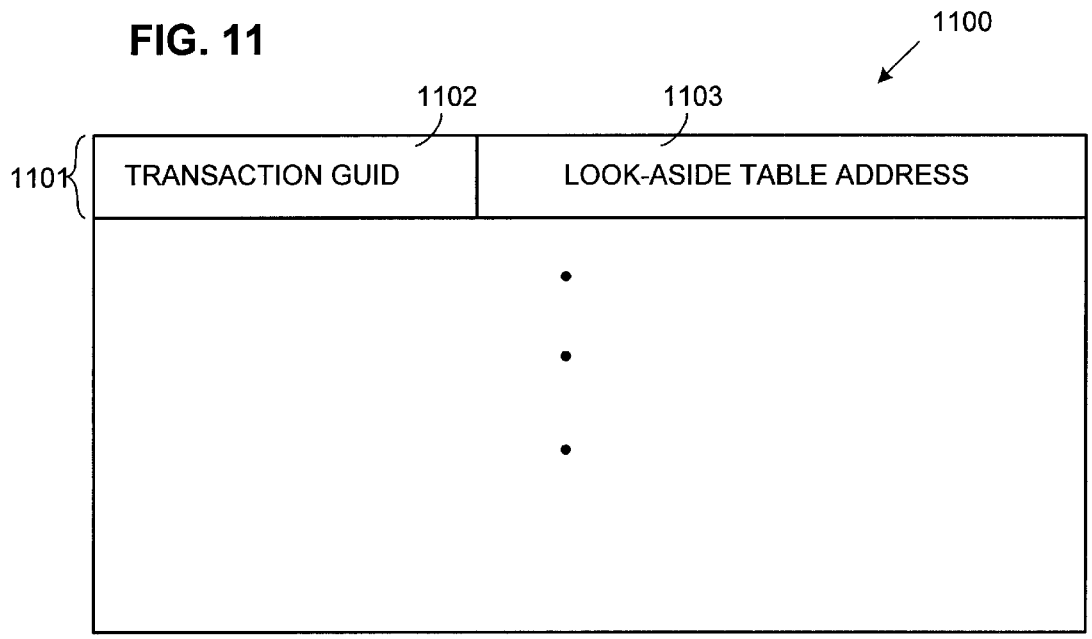
FIG. 11 is diagram of a transaction data structure for use in an exemplary plementation of the invention.

One embodiment for a transaction table 1100 is shown in FIG. 11 in which each entry 1101 comprises a GUID 1102 for a transaction and the shared memory address 1103 for the look-aside table associated with the transaction. The GUID 1102 is a 16-byte (four 32-bit words) globally unique identifier assigned by the operating system. An entry is located within the transaction table 1100 by exclusively OR'ing the four words of the GUID, dividing the result by the number of maximum number of entries in the transaction table, and using the remainder to address the entry. Hash duplicates are handled as described above for the look-aside table. The address of the transaction table in the shared memory is stored in a fixed location in the shared memory so that it can always be found by the client processes.

As mentioned above, the transaction and look-aside tables reside on fixed length shared memory pages and are capable of being resized when necessary. Both tables are designed to be allocated in various sizes with the smallest table having seventeen entries and the largest having 866,586 entries (the number of entries that fit on 1974 shared memory pages). There are four other intermediate sizes in the DTC implementation: 127,439 (the number of entries that fit on one shared memory page), 7463 (the number of entries that fit on seventeen shared memory pages, and 55,753 (the number of entries that fit on 127 shared memory pages). The table size is factored into the hashing function as described above so that the resulting entry address falls within the number of entries for that size of table. Alternate table sizes are contemplated as within the scope of the invention.

While any given table size can accommodate any possible number of entries because collisions are resolved using the linked list described above, having many more entries than the table is sized to hold leads to reduced performance when it is necessary to traverse the linked list.

A hash table that fits on a single shared memory page is illustrated in FIG. 12, e.g., a hash table with seventeen, 127, or 439 entries in the DTC implementation. A hash table that spans multiple shared memory pages is illustrated in FIG. 13, e.g., a hash table of 7463, 55,753 or 86,586 entries in the DTC implementation. In both hash table data structures, the first four bytes 1201, 1301 contain the current size of the hash table. Both figures also illustrate the use of linked lists 1204, 1306 to handle collisions and overflow among table entries 1203, 1303 respectively. The difference in the two data structures is that the larger sized hash table 1300 uses a two level page linking mechanism. The first level 1301 is an array of page entries 1303 that point to pages 1304 which contain the hash entries 1303 comparable with the hash entries 1203 of hash table 1200. The smallest three hash table sizes are single level data structures as shown in FIG. 12. The larger three hash table sizes are two level data structures as shown in FIG. 13.

In order to increase the performance of the IMDB system by reducing the number of traverses of a linked collision list, a transaction or look-aside table is resized to the next size if the current table size is not the maximum allowed size and the number of entries in the current table is greater than the maximum number of entries allowed under the current size. Performance can also be degraded if a transaction or look-aside table is too large since the dedicated but unused space in shared memory cannot be allocated to other data. Therefore, a table is shrunk to a smaller size if the number of entries is less than one half the number of entries in the next smaller sized table.

The process of resizing a transaction or look-aside table is the responsibility of the core process which acquires an exclusive latch on the page or pages involved so that all client processes are denied access to the look-aside table during resizing. All entries in the old table are deleted from the old table and are added to the new table. Each entry is rehashed because the hash function for the new table can result in a different table address for the entry than its table address in the old table.

The application of the in-memory database system described in the first two section to support Microsoft's Distributed Transaction Controller has been described in this section. A combination of page latches and hashing methodologies enables the unique versioning scheme described in the previous sections, thus providing concurrent database access while reducing the processing time for transactions.

Conclusion

A in-memory database system has been described that enables multiple concurrent read-only access to database records through a unique versioning scheme based on look-aside tables associated with modifying transactions.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that a persistent database is not necessary to practice the invention and that the data structures and methods of the invention can be used to implement a stand-alone, non-persistent data base. Additionally, while the invention has been described in terms of transactions that commit or abort related updates as a group, the look-aside table versioning scheme is equally applicable to transactions which commit or abort updates individually by including information in the look-aside table which associates each table entry with the update command that created the entry. Furthermore, those of ordinary skill within the art will appreciate that the invention can be practiced with any type of back-end database server, requiring only that the in-memory database manager process be constructed to execute the appropriate commands to read and write data to the database server.

The terminology used in this application with respect to is meant to include all of these environments. Therefore, it is manifestly intended that this invention be limited only by the following claims and equivalents thereof.

We claim:

1. In a computer having a plurality of client processes, a portion of memory shared by the client processes, said shared memory being directly addressable by each of the client processes, and a plurality of database records stored in the shared memory, a computerized method for in-memory database records management to control access of said client processes to the database records in shared memory such that an individual client process has access exclusive of other client processes to uncommitted modifications made by the individual client process to any of the database records in shared memory, the method comprising:

creating a look-aside table for each client process;

creating a new database record when any of the client processes requests a modification of a database record;

creating a record entry in the look-aside table for said any client process requesting the modification;

preserving any original database record affected by an uncommitted modification; and upon a client process accessing a database record with both a new and a original version, if the look-aside table for the client process has the record entry, then permitting the client process to access the new database record, otherwise permitting the client process to access the original database record.

2. A computerized method for controlling access to database records stored in memory shared among multiple processes comprising:

creating a record entry in a look-aside table for a process when the process updates a database;

preserving any original database record affected by the update;

giving the process access to a new database record created by the update if a record entry corresponding to the new database record exists in the look-aside table for the process;

setting a modified flag in the original database record; and determining if a search of the look-aside table for a process is required when the process accesses a database record based on the state of the modified flag.

3. A computerized method for controlling access to database records stored in memory shared among multiple processes comprising:

creating a record entry in a look-aside table for a process when the process updates a database;

preserving any original database record affected by the update;

giving the process access to a new database record created by the update if a record entry corresponding to the new database record exists in the look-aside table for the process; and deleting any original database record corresponding to a record entry for a new database record in a look-aside table when the process associated with the look-aside table commits its updates.

4. A computerized method for controlling access to database records stored in memory shared among multiple processes comprising:

creating a record entry in a look-aside table for a process when the process updates a database;

preserving any original database record affected by the update;

giving the process access to a new database record created by the update if a record entry corresponding to the new database record exists in the look-aside table for the process; and deleting any new database record corresponding to a record entry in a look-aside table when the process associated with the look-aside table aborts its updates.

5. A computerized method for controlling access to database records stored in memory shared among multiple processes comprising:

creating a record entry in a look-aside table for a process when the process updates a database;

preserving any original database record affected by the update;

giving the process access to a new database record created by the update if a record entry corresponding to the new database record exists in the look-aside table for the process;

creating an index entry in the look-aside table for a process when the process updates key data for a database record;

preserving any original key data affected by the update; and giving a process access to any new key data created by the update if a key entry corresponding to the new key data exists in the look-aside table for the process.

6. A computerized method for controlling access to database records stored in memory shared among multiple processes comprising:

creating a record entry in a look-aside table for a process when the process updates a database;

preserving any original database record affected by the update;

giving the process access to a new database record created by the update if a record entry corresponding to the new database record exists in the look-aside table for the process;

creating an index entry in the look-aside table for a process when the process updates key data for a database record;

preserving any original key data affected by the update;

giving a process access to any new key data created by the update if a key entry corresponding to the new key data exists in the look-aside table for the process;

marking any new key data as inserted; and marking any original key data as deleted.

7. A computerized method for controlling access to database records stored in memory shared among multiple processes comprising:

creating a record entry in a look-aside table for a process when the process updates a database;

preserving any original database record affected by the update;

giving the process access to a new database record created by the update if a record entry corresponding to the new database record exists in the look-aside table for the process;

creating an index entry in the look-aside table for a process when the process updates key data for a database record;

preserving any original key data affected by the update;

giving a process access to any new key data created by the update if a key entry corresponding to the new key data exists in the look-aside table for the process; and deleting any original key data corresponding to an index entry for new key data in a look-aside table when the process associated with the look-aside table commits its updates.

8. A computerized method for controlling access to database records stored in memory shared among multiple processes comprising:

creating a record entry in a look-aside table for a process when the process updates a database;

preserving any original database record affected by the update;

giving the process access to a new database record created by the update if a record entry corresponding to the new database record exists in the look-aside table for the process;

creating an index entry in the look-aside table for a process when the process updates key data for a database record;

preserving any original key data affected by the update;

giving a process access to any new key data created by the update if a key entry corresponding to the new key data exists in the look-aside table for the process; and deleting any new key data corresponding to an index entry in a look-aside table when the process associated with the look-aside table aborts its updates.

9. A computerized system comprising:

a plurality of client processes for manipulating data;

a shared memory for caching the data manipulated by the plurality of client processes; and an in-memory database manager for creating a table in the shared memory for each one of the plurality of client process that requests changes to data in the shared memory, for making the changes, and for modifying the table to reflect changes made to the data requested by the associated client process, wherein each client process uses its associated table to determine if it has access to changed data in shared memory.

10. The computerized system of claim 9, wherein the in-memory database manager further uses the table associated with a client process to make data changed in response to a request by the client process accessible to the plurality of client processes when the client process commits its changes.

11. The computerized system of claim 9, wherein the in-memory database manager further uses the table associated with a client process to void data changed in response to a request by the client process when the client process aborts its changes.

12. The computerized system of claim 9, further comprising a database located external to the shared memory from which the in-memory database manager reads data into the shared memory and writes data from the shared memory.

13. A computer-readable medium having stored thereon a look-aside table data structure comprising:

an old record field containing data representing a record identifier for an original record;

a new record field containing data representing a record identifier for a new record associated with the original record identified by the old record field; and a column bitmap field containing data representing columns of data that are different between the original record identified by the old record field and the new record identified by the new record field and each bit in the column bitmap field represents a data field in the new record, and each set bit in the bitmap field indicates a modification of the data in the corresponding data field of the new record, such that upon committal of database changes, only data fields represented by a set bit need be written back to the database.

14. The computer-readable medium of claim 13, wherein the data in the old record field is null if the new record identified by the new record field is created from a blank record.

15. The computer-readable medium of claim 13, wherein the data in the new record field is null if the old record identified by the old record field is deleted.

16. The computer-readable medium of claim 13, further comprising:

a key record identifier field containing data representing an address for a record containing a key value;

a key length field containing data representing the length of the key in the record identified by the key record identifier field;

a primary key length field containing data representing the length of a primary key associated with the key in the record identified by the key record identifier field;

an index identifier field containing data representing an index structure for the key in the record identified by the key record identifier field; and a data record identifier field containing data representing an address for a data record associated with the key value identified by the key record identifier field.

17. A computer-readable medium having stored thereon a transaction table data structure directly readable in shared memory by plural client processes, comprising:

a transaction identifier field containing data representing a unique identifier for a transaction; and a table address field containing data representing the location of a table structure holding update information for, indicating whether the transaction identified by the transaction identifier field has requested changes to database records read from a database into memory shared by multiple transactions; and indicating the location of the modified versions of the database records.

18. A computer-readable medium having computer-executable instructions to cause a computer to perform a method comprising:

dividing a shared memory into pages and associating an exclusive page latch with each page, and further associating a plurality of shared page latches with each page, wherein the exclusive page latch is acquired by a core process when writing data to a page, and one of the shared page latches is acquired by a client transaction when reading data from a page;

writing unmodified database data in the pages;

creating a look-aside table on a page in response to a client transaction requesting an update to the database data, wherein the look-aside table contains entries for tracking the updates;

writing the updated database data in the pages; and deleting unmodified database data from the pages when the corresponding updated database data is committed by the transaction that requested the update.

19. The computer-readable medium of claim 18, wherein the look-aside table is expanded when the size of the table is not equal to a pre-determined maximum size and the number of entries in with the table is greater than a pre-determined maximum number of entries for the size of the table.

20. The computer-readable medium of claim 19, wherein the look-aside table is contracted when the number of entries in the table is less than one half of the number of entries in a predetermined next smaller size.

21. The computer-readable medium of claim 19, wherein the look-aside table can span multiple pages.

22. The computer-readable medium of claim 19, further comprising determining the look-aside table for a transaction based on a transaction number stored in a transaction table.

23. The computer-readable medium of claim 19, wherein the look-aside table containing record entries and the method further comprises locating a record entry for a record using a table address calculated as (dw ^bh ^(slot <<23)) % table size wherein dw is the low order four bytes of a shared memory page number on which the record is stored, bh is the high byte of the shared memory page number, slot is the slot on the page associated with the entry, ^is a bitwise exclusive OR operation, <<is a left shift operation, and % is a module operation.

24. The computer-readable medium of claim 23, wherein the look-aside table further contains index entries associated with key for a record and the method further comprises locating an index entry for a key using a table address calculated as (OBJID ^(DBID <<16) ^indexid <<12^keyhash) % table size wherein OBJID and DBID identify a database table for the record, indexid identifies the index for the key, keyhash is the result of a rotating exclusive OR'ing of the bytes of the key, ^is a bitwise exclusive OR operation, <<is a left shift operation, and % is a module operation.

25. The computer-readable medium of claim 18 including a method for maintaining data consistency on a shared memory page comprising:

synchronizing read-only access to the shared memory page wherein each client transaction accessing the shared memory page to read data, holds one of the plurality of shared page latches for only as long as necessary to read the data; and synchronizing update access to the shared memory page with the read-only accesses to the shared memory page using the single exclusive page latch associated with the shared memory page, wherein the core process can request the exclusive page latch and latches the shared memory page for update when all shared page latches are released, and holds the exclusive page latch for only as long as necessary to update the data.

26. The method of claim 25, further comprising:

clearing all shared page latches associated with the page when the core process has not obtained the exclusive page latch after a pre-determined period of time has elapsed since the core process requested the exclusive page latch.

27. The computerized method of claim 1, further comprising:

setting a modified flag in the original database record; and determining if a search of the look-aside table for a client process is required when the client process accesses a database record based on the state of the modified flag.

28. The computerized method of claim 1, further comprising:

deleting any original database record corresponding to a record entry for a new database record in a look-aside table when the client process associated with the look-aside table commits its updates.

29. The computerized method of claim 1, further comprising:

deleting any new database record corresponding to a record entry in a look-aside table when the client process associated with the look-aside table aborts its updates.

30. The computerized method of claim 1, further comprising:

creating an index entry in the look-aside table for a client process when the client process updates key data for a database record;

preserving any original key data affected by the update; and giving a client process access to any new key data created by the update if a key entry corresponding to the new key data exists in the look-aside table for the client process.

31. The computerized method of claim 30, further comprising:

marking any new key data as inserted; and marking any original key data as deleted.

32. The computerized method of claim 30, further comprising:

deleting any original key data corresponding to an index entry for new key data in a look-aside table when the client process associated with the look-aside table commits its updates.

33. The computerized method of claim 30, further comprising:

deleting any new key data corresponding to an index entry in a look-aside table when the client process associated with the look-aside table aborts its updates.

34. The computerized method of claim 1 wherein said permitting access comprises:

checking the look-aside table by the client process and determining by the client process which database record to access based on the content of the look-aside table.

* * * * *